(12) United States Patent
Sudau et al.

(10) Patent No.: US 8,544,526 B2
(45) Date of Patent: Oct. 1, 2013

(54) ENERGY RECOVERY IN A STEEL MILL

(75) Inventors: Peter Sudau, Hilchenbach (DE); Juergen Seidel, Kreuztal (DE); Horst Gaertner, Duesseldorf (DE); Axel Stavenow, Duesseldorf (DE)

(73) Assignee: SMS Siemag AG, Duesseldorf (DE)

( * ) Notice: Subject to any disclaimer, the term of this patent is extended or adjusted under 35 U.S.C. 154(b) by 0 days.

(21) Appl. No.: 13/203,730

(22) PCT Filed: Mar. 2, 2010

(86) PCT No.: PCT/EP2010/001263
§ 371 (c)(1),
(2), (4) Date: Feb. 2, 2012

(87) PCT Pub. No.: WO2010/099920
PCT Pub. Date: Sep. 10, 2010

(65) Prior Publication Data
US 2012/0118526 A1    May 17, 2012

(30) Foreign Application Priority Data

| Apr. 28, 2000 | (DE) | 10 2009 018 899 |
| Mar. 2, 2009 | (DE) | 10 2009 011 073 |
| Apr. 7, 2009 | (DE) | 10 2009 016 384 |
| Apr. 27, 2009 | (DE) | 10 2009 018 734 |
| Jul. 2, 2009 | (DE) | 10 2009 031 557 |

(51) Int. Cl.
*B22D 11/22* (2006.01)
(52) U.S. Cl.
USPC ........................................ 164/455

(58) Field of Classification Search
USPC .................................. 164/5, 444, 455, 486
See application file for complete search history.

(56) References Cited

U.S. PATENT DOCUMENTS

| 4,059,023 A | 11/1977 | Sproul |
| 4,351,633 A | 9/1982 | Ortner |
| 4,395,296 A * | 7/1983 | Abrams ........................ 148/654 |
| 4,509,582 A | 4/1985 | Kriegner |
| 4,846,259 A | 7/1989 | Fujimoto |
| 5,288,454 A | 2/1994 | Lang |
| 6,857,467 B2 | 2/2005 | Lach |
| 6,935,856 B2 * | 8/2005 | Le Goueffiec et al. ......... 432/11 |
| 2011/0041502 A1 | 2/2011 | Zimron |

FOREIGN PATENT DOCUMENTS

| DE | 3019714 A | 12/1981 |
| DE | 3432783 A | 3/1986 |
| DE | 4137946 A | 5/1993 |
| DE | 10332270 B | 9/2004 |

(Continued)

*Primary Examiner* — Kevin P Kerns
(74) *Attorney, Agent, or Firm* — Andrew Wilford

(57) ABSTRACT

Energy is recovered from steel products produced in a steel mill where the products are transported into a storage area by first extracting heat from the steel products prior to or after transport into the storage area by heat exchangers for a predetermined period in which residual heat of the steel products is transferred by the heat exchangers into a heat-transfer medium to heat same. The heated transfer medium is then transferred via heat-transfer transport lines for power generation or for direct use of the process heat in other heat consumers. This transport of the heat-transfer medium from the heat exchangers to the power-generating plant in the heat-transfer transport lines is carried out only at pump feed pressure or using as a heat-transfer medium liquid mineral or synthetic thermal oil or a salt melt so as not to build up a steam pressure above 2 bar.

5 Claims, 22 Drawing Sheets

(56) References Cited

FOREIGN PATENT DOCUMENTS

| | | | |
|---|---|---|---|
| JP | 57060020 | B | 4/1982 |
| JP | 58061318 | B | 4/1983 |
| JP | 58133323 | B | 8/1983 |
| JP | 58215255 | B | 12/1983 |
| JP | 61149796 | B | 7/1986 |
| JP | 06257886 | B | 9/1994 |
| JP | 09318172 | B | 12/1997 |
| JP | 11023181 | B | 1/1999 |
| JP | 20080096048 | B | 4/2008 |
| JP | 2008202846 | B | 9/2008 |
| JP | 2008260022 | B | 10/2008 |

* cited by examiner

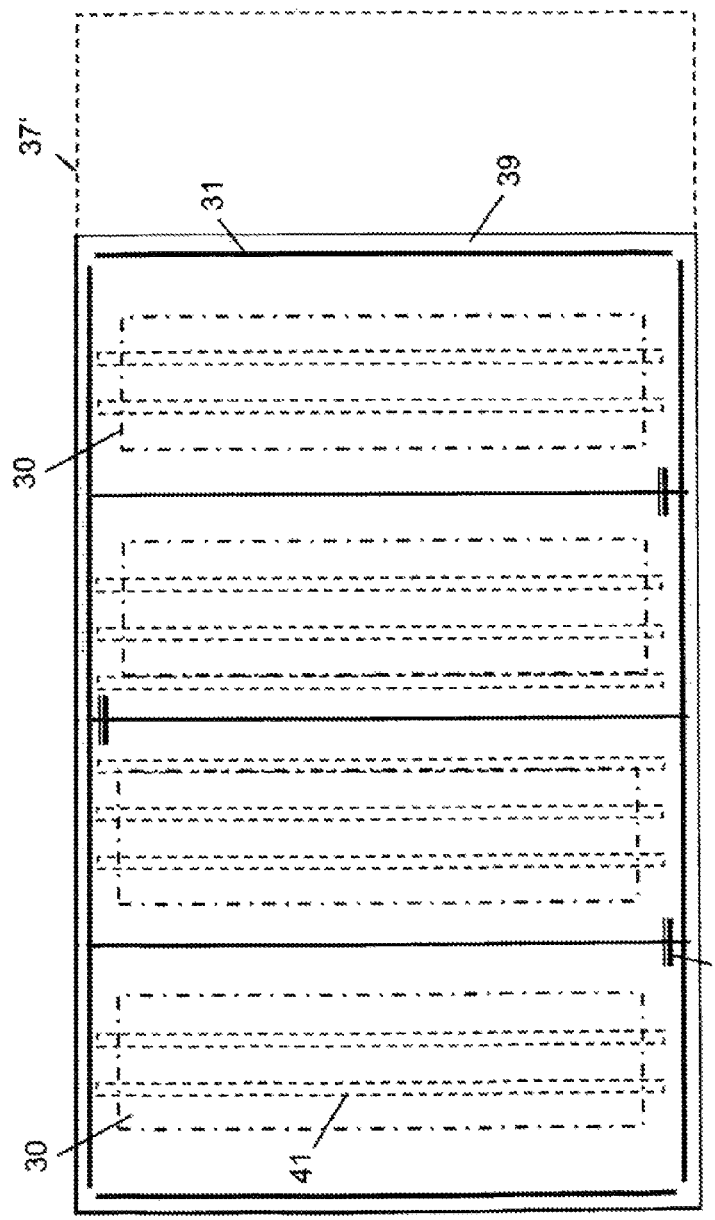
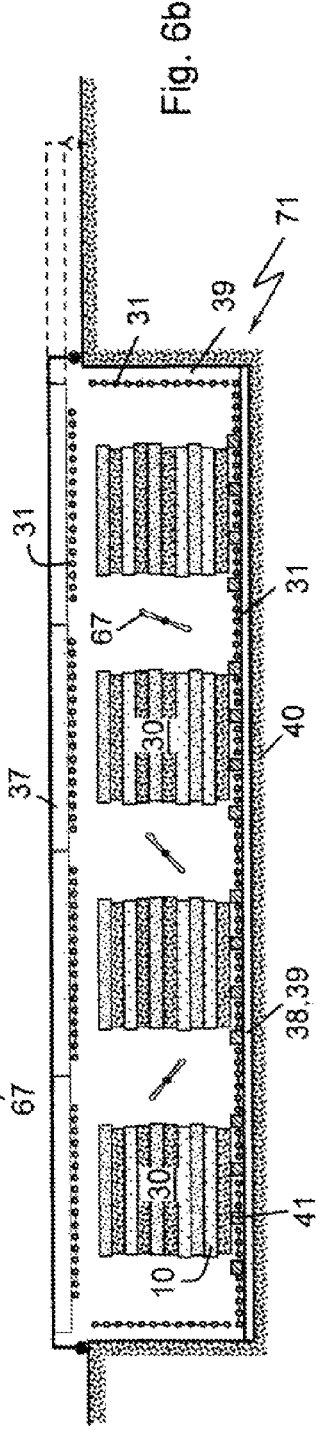
Fig. 6a
Fig. 6b

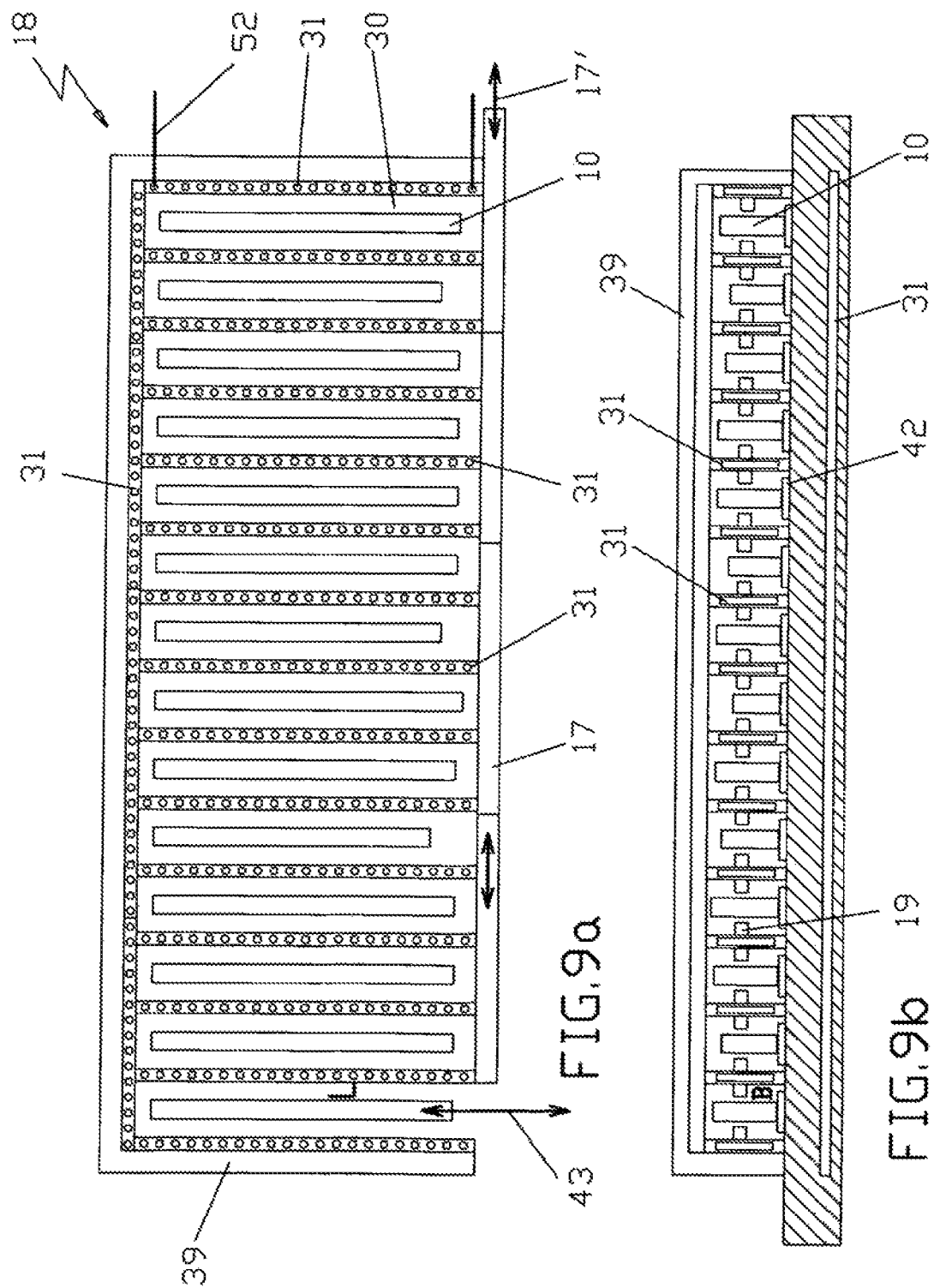

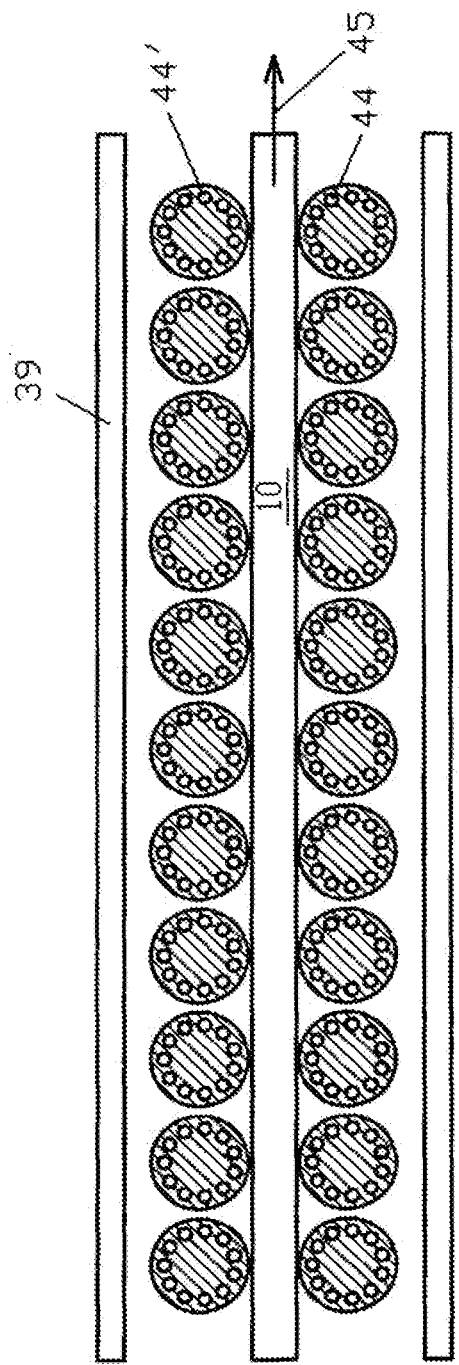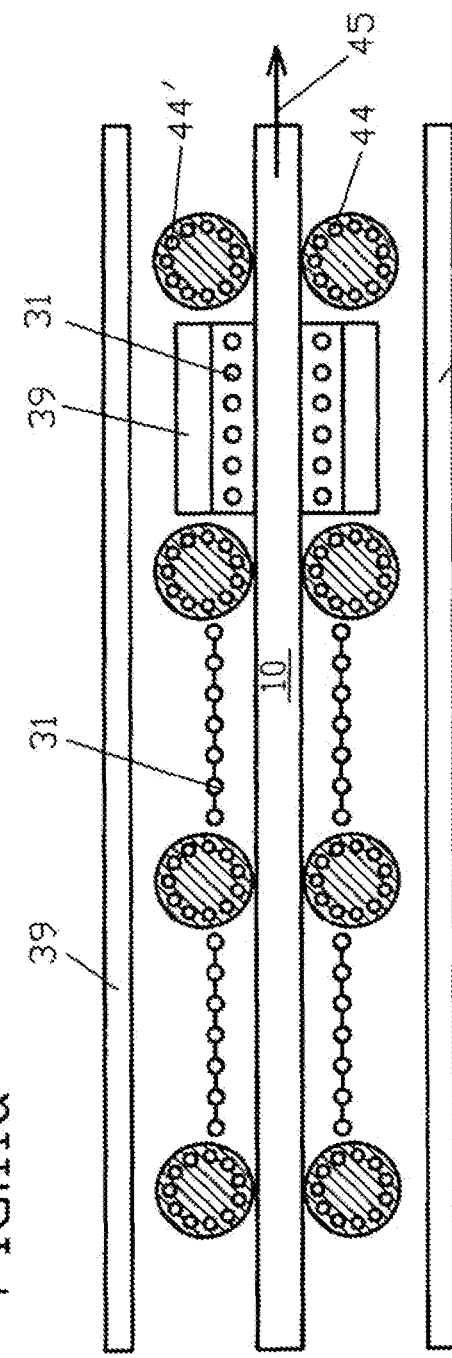

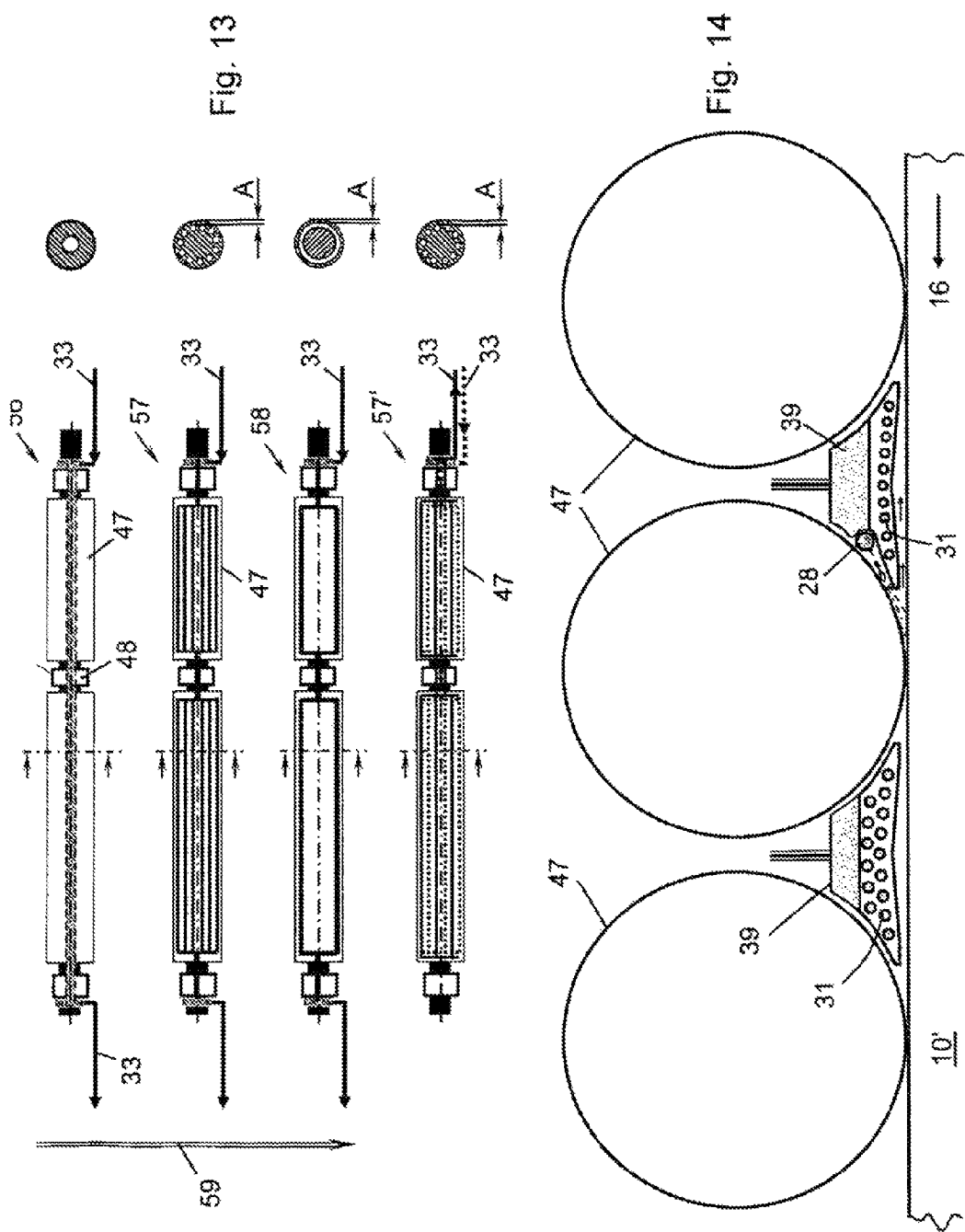

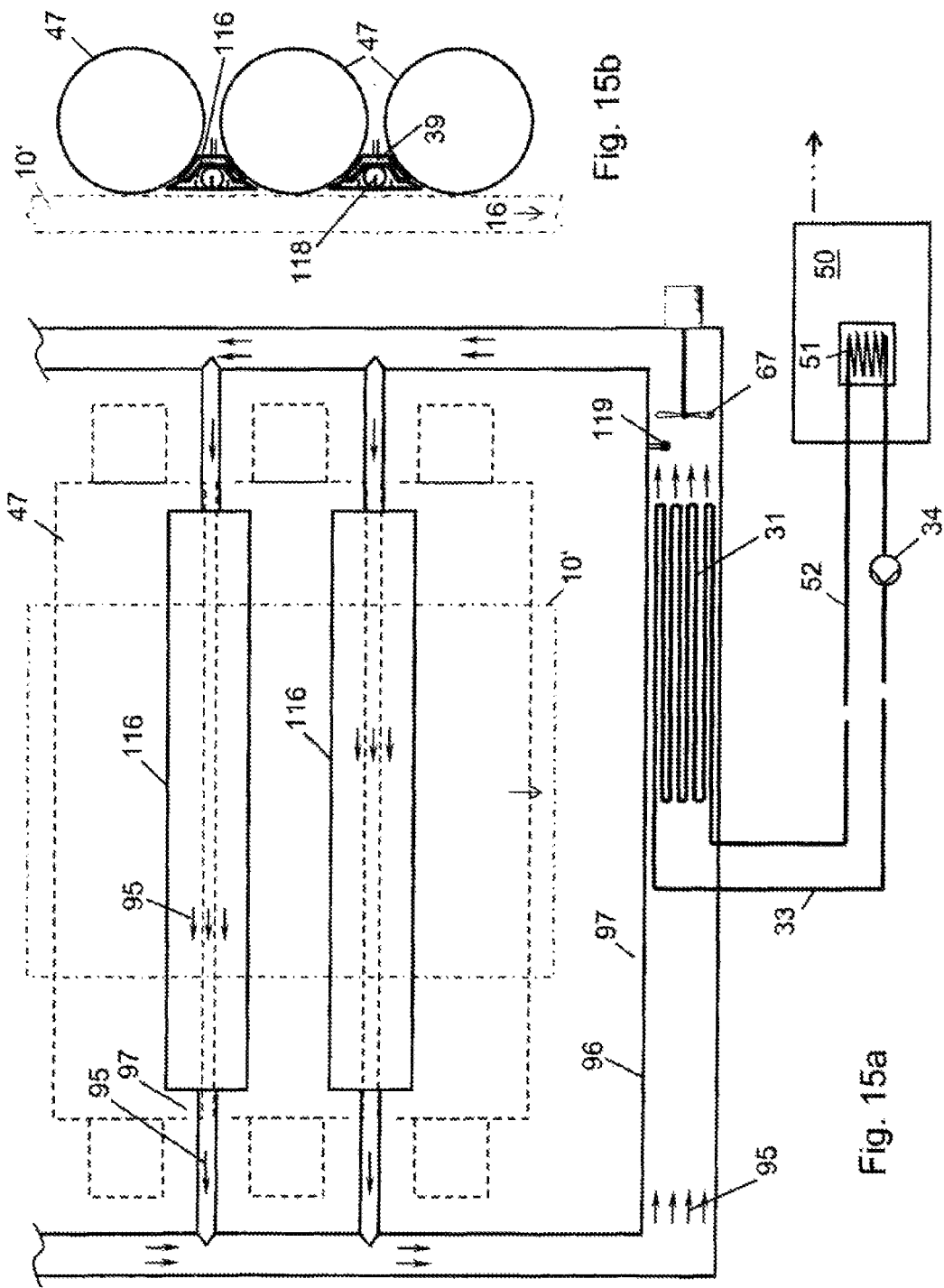

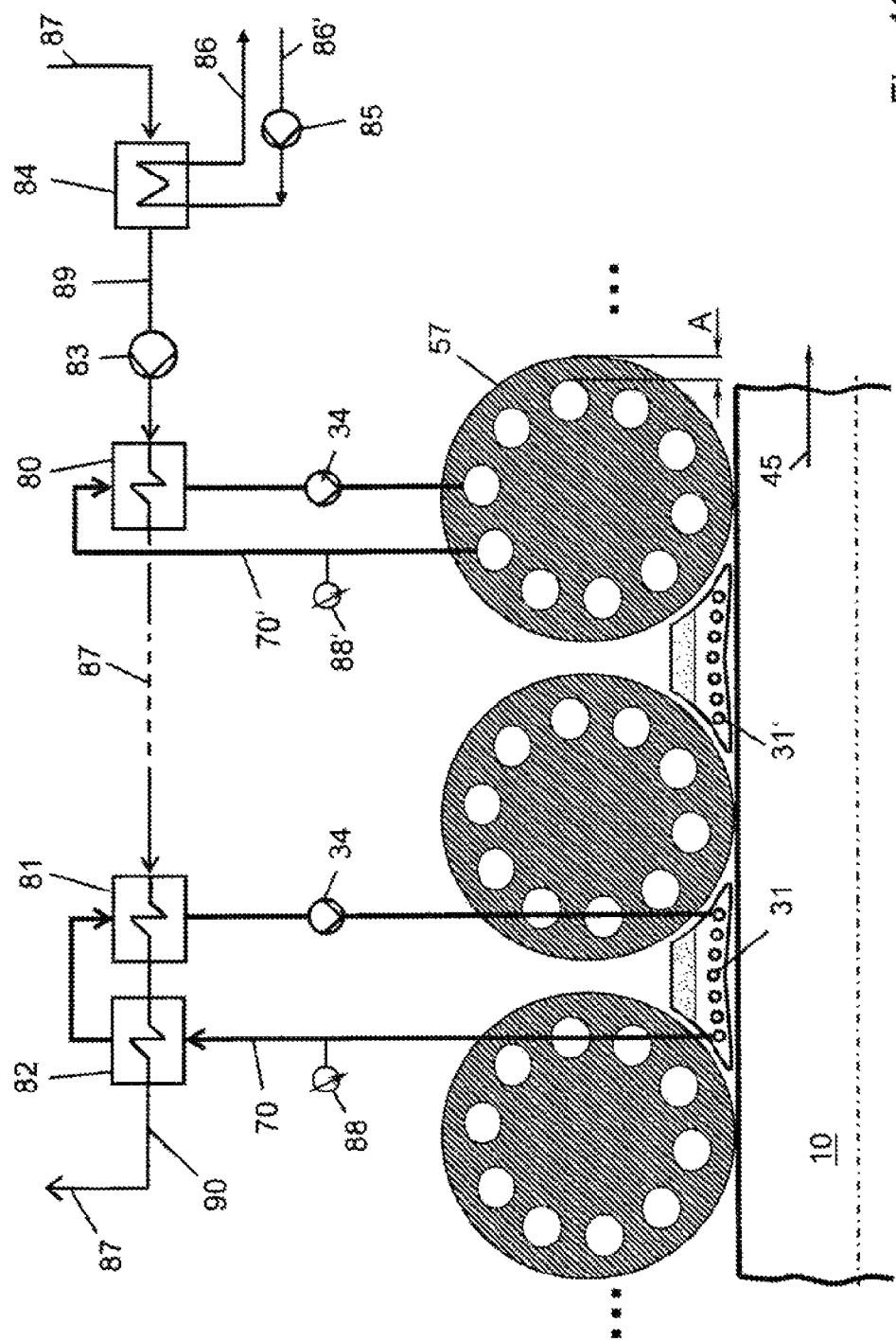

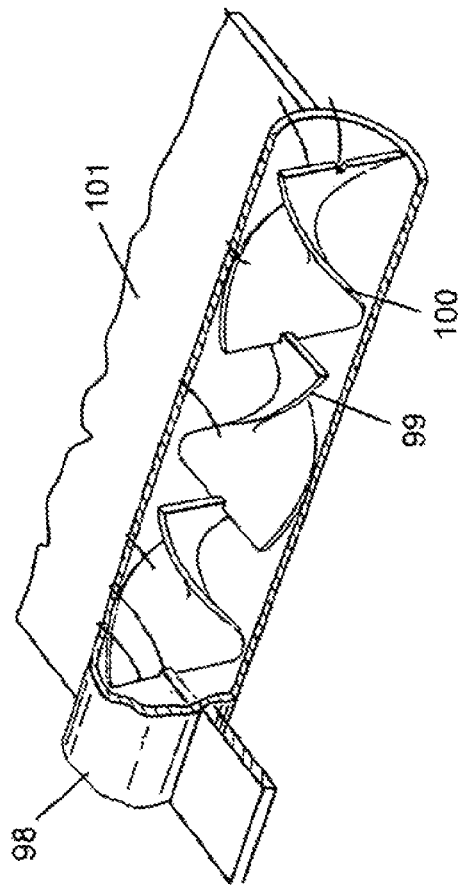
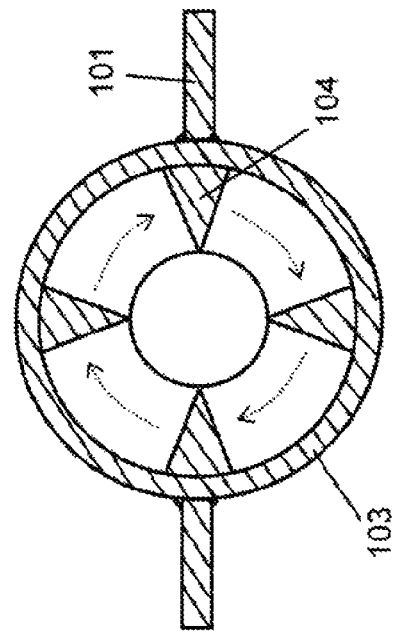
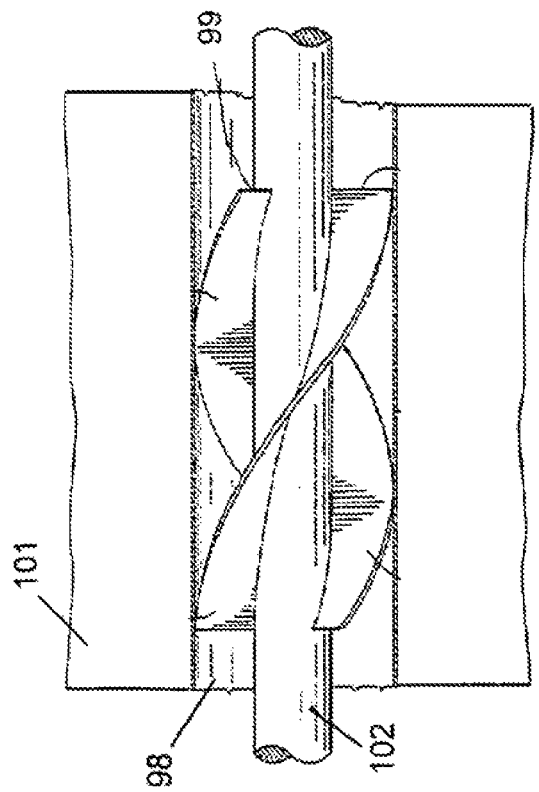
Fig. 20a
Fig. 20b
Fig. 20c

ENERGY RECOVERY IN A STEEL MILL

CROSS REFERENCE TO RELATED APPLICATIONS

This application is the US-national stage of PCT application PCT/EP2010/001263 filed 2 Mar. 2010, published 10 Sep. 2010 as WO2010/099920, and claiming the priority of German patent application 102009001073.9 itself filed 2 Mar. 2009 and German patent application 102009016384.0 itself filed 7 Apr. 2009, German patent application 102009018734.0 itself filed 27 Apr. 2009, German patent application 102009018889.1 itself filed 28 Apr. 2009, and German patent application 102009031557.8 itself filed 2 Jul. 2009.

FIELD OF THE INVENTION

The invention relates to a method of and a plant for energy recovery in continuous-casting plants and hot-rolling steel mills, in particular in the production and processing of slabs to form steel products such as strips or coils, wherein the thermal energy released during cooling of the cast billet and the slabs and/or coils is collected and used.

In cooling steel from about 1570° C. (liquid) to an average steel-product temperature of about 1200° C. on leaving the continuous-casting plant, about 145 kWh/t thermal energy is extracted from the steel. At present this heat is lost unused to the environment (air and cooling water).

In hot strip plants, after the casting, the residual heat of the slabs has hitherto been used such that the slabs are either directly rolled or placed into the furnace warm or hot. A great deal of heating energy can be saved hereby. The prerequisite for the hot or direct use are the spatial closeness of the continuous-casting plant and slab furnace. However, this is not always available in the case of older installations. For reasons of logistics, surface inspection, rolling program planning, etc., only a part of the production is further processed directly or hot. Accordingly, the slabs normally cool after casting in a hall through which flows air and are stacked prior to their further transport. The same applies to the residual heat present in the coils after winding, which often cool in air in the coil-storage area.

Residual heat utilization by converting heat into electric energy or utilization of the process heat are increasingly carried out in branches of industry like the metal, cement or glass industry, which are very energy-intensive. Also in the field of steel production it is known from WO 2008/075870 A1 to discharge the waste heat generated during the production of molten iron by reduction in a fluidized bed reactor for high-pressure steam generation, from which then a steam turbine is operated for power generation, for example.

EP 0 044 957 B1 describes a system for recovering latent and sensible heat of effluent gases from a cupola furnace for cast-iron production or a similar melting installation for the purpose of obtaining electric and/or heat energy in the form of steam and/or hot water. The system is composed of a thermal unit with a burner and two waste-heat boilers through which flow flue gases as well as in the production of electric energy in addition a turbine fed with steam from a superheater and an AC generator.

From DE 2622722 C3 a device is known for cooling hot steel slabs following the last rolling operation, in which the steel slabs are raised on edge between perpendicular holding columns provided in parallel rows. The heat emitted by the steel slabs is absorbed by cooling walls with tube bundles through which flows cooling water provided between the holding columns and used to generate steam.

EP 0 027 787 B1 describes a plant for recovering the sensible heat of slabs cast by the continuous-casting method in a cooling chamber by air, which is brought into direct contact with the slab surfaces by a blower. The air heated in this manner is then used as a heating medium outside the cooling chamber, in particular for a circulatory medium conducted in a thermodynamic circulatory process.

OBJECT OF THE INVENTION

Based on this described prior art, the object of the invention is to provide a method and a system for energy recovery of the cooling heat of steel products in a steel mill in the form of electric energy or use of the process heat in other heat consumers.

SUMMARY OF THE INVENTION

This object is attained in terms of method in that the billet or the slabs are transported toward the rolling mill or into the slab-storage area and thereafter into the coil-storage area and during casting in heat exchangers, and/or the transport in heat exchangers heat is extracted and/or they are there partly are deposited one on top of the other on specially prepared storage areas provided with heat exchangers for a short time or several hours or days, wherein in this transport period the residual heat is transferred from the cast billet and/or slab and/or in the storage period via the heat exchangers into a heat-transfer medium and heats it, which then is discharged via heat-transfer transport lines for power generation and/or for direct use of the process heat in other heat consumers.

According to the invention, heat is already extracted from the billet during casting and this heat is carried off via roller heat exchangers and plate heat exchangers for use.

Energy can already be recovered in the upstream region of the continuous-casting plant. The ingot mold can be cooled with a heat-transfer medium, for example with thermal oil. In case 1 the entire ingot mold is traversed by thermal oil. The temperature level of the ingot mold outer shell can hereby rise to about 450° C. in order to obtain efficient heat flow. Multiple cooling ducts are here provided from left to right and back on the ingot mold rear wall in order to achieve a higher thermal oil temperature. Alternatively, a two-circuit cooling system is conceivable (case 2). In the upper region of the ingot mold (meniscus) the conventional cooling takes place with water. In the lower less sensitive region the cooling with thermal oil described above can take place.

In the further course of the continuous-casting plant, the heat-transfer takes place to the billet rollers. These are preferably constituted as heat exchangers and absorb this heat. In addition, differently constructed heat exchangers are provided between the billet rollers in order to additionally increase the energy yield. Also heat exchangers can be attached next to the cast billet (in the region of the billet roller edges), in order to also absorb the energy emitted to the side of the billet.

After the separation or cutting of the slabs to length, the slabs are transported as quickly as possible from the continuous-casting plant to the slab-storage area or, after winding, the coils are transported as quickly as possible into the coil-storage area and placed there on the storage areas provided with heat exchangers. Also during their transport to the slab-storage area or coil-storage area part of their residual heat can already be extracted from the slabs or coils, to which end the conveyor leading to the storage areas according to the invention are thermally insulated and/or are provided with heat exchangers. Transport of the slabs can be carried out in the longitudinal direction in a type of inverse roller hearth furnace or in the transverse direction in a type of inverse pusher furnace or rocker-bar furnace. In case of slow transport speed and long transport distance, this construction represents a part of the slab-storage area with heat exchangers for heat recovery.

The slab- or coil-storage areas can be advantageously constituted as high bays into which the slabs or coils are inserted flat by, for example, a stacker laterally into the storage areas. The slabs or coils thereby bear against carrying rails. Walls, ceilings and base constructions can be constituted as bearing constructions and serve as heat exchangers at the same time. Alternatively and especially advantageously, the heat exchangers are positioned in front of the bearing walls so that their accessibility and easy replaceability are available in the case of maintenance. In another embodiment, the slabs are tilted up stored on end between heat exchangers, the slab-storage areas being provided with guide rods and/or side rollers in order to prevent the slabs from falling over. In a slab-storage area of this type the slabs bear only at a few points, for example, against rollers.

In order that slabs or coils lie on the storage areas with the highest possible temperature, a corresponding useful/optimum replacement of the slabs or coils inside the slab-storage area or coil-storage area is carried out. In order that the residual heat present can be absorbed by the heat-transfer medium in an optimum manner, the storage areas are constructed not only beneath but also according to an advantageous embodiment of the invention above and next to the slabs or coils with heat exchangers. In order to be able to carry out an unhindered transport of the slabs or coils into and out of these storage areas, the heat exchangers provided above the slabs or coils are thereby constructed in a pivotable or moveable manner. Alternatively, the storage areas are provided with pivotable or moveable heat-insulated insulating hoods with or without integrated heat exchangers.

In order to increase the efficiency of the heat exchangers or the convective heat-transfer, the heat exchangers are provided with ribs or, to produce a direct heat-transfer, they are laid directly on the slabs or coils or touch the billet or slab surface or are provided very close in front of the hot surface.

For better mixing of the heat-transfer medium and/or to further increase of the efficiency of the heat-transfer of heat exchangers, turbulence plates or webs can be provided inside the pipelines of the heat exchanger.

Also the generation of a turbulent airflow in the heat is exchanger region or inside the storage areas with blowers or fans, for example, shortens the cooling period. However, the maximum permissible cooling speed of the slabs or coils must be taken into consideration hereby in order not to cause any reduction in quality.

A typical preferred illustrated embodiment for the arrangement of several storage areas next to one another is possible in the form of a holding pit. As a rule, lower (alternatively, also higher) cooling speeds are set in a targeted manner in holding pits for the stored slab stacks. The slabs lie in the longitudinal direction on carrying bars. Through displaceable cover plates, the slab stacks can be produced underneath or the slabs, after cooling, can be removed here individually. Alternatively, the cover plates can be pivoted upward individually for each storage area. Heat-exchanger pipes or plates are provided on the base, on the wall and optionally also on the ceiling. Instead of discharging the energy to the surroundings via forced convection, the energy is conveyed to these heat exchangers in a targeted manner. The outer surfaces of the pit are thermally insulated. Instead of several storage areas, individual locations or slab stacks can also be provided in a heat exchanger chamber.

The typical preferred process steps in slab transport and slab storage with a slab heat recovery system are as follows:

a) Casting the slab b) Separation of the slab after the continuous-casting plant to required length (optionally also in the region of the slab-storage area) and using a heat insulation before and in the region of the cutting machine. Thereby the insulating hoods in the region of the flame-cutting machine are pivoted upward and lowered again in an incremental manner depending on the position of the is burners in order to minimize heat loss in the region between the continuous-casting plant and the flame-cutting plant and inside the flame-cutting plant. Insulating cassettes are likewise installed between the rolling mill rollers in the possible regions. Optionally, the rolling mill rollers or the covers are already constituted as heat exchangers in this region.

c) Transport of the slab into the slab-storage area on a roller conveyor provided with heat exchangers for energy recovery with, for example casting speed or optionally on a heat insulated roller conveyor at preferably increased transport speed.

d) Moving the slab to a lift or displacement position at casting speed or optionally at increased transport speed. The transport in phase c) and d) is controlled in terms of time such that the necessary minimum temperature of the slab depending on the slab material of for example 800° C. for storage is not fallen below.

e) If the lift position is provided with heat insulating hoods, they are lifted up.

f) Quick transport of the slab to a heat exchanger location. Preferably the slab is stacked or transported into a position (for example pit) surrounded by heat exchangers. In the stacking of the slabs, the heat exchanger chamber is opened for only a short time for filling with slabs.

g) Slow cooling of the slabs at the heat exchanger location at which the thermal energy is collected.

h) After the expiration of a predetermined time period or the achievement of a slab stack temperature at a defined reference location or when the surface temperature of the slabs is lower than the heat exchanger temperature, the slab stack is broken down again.

The cooling region in which the residual heat of the slabs or coils can be fed to further use during their cooling with the aid of heat exchangers, in the case of slabs is starting from the outlet temperature from the continuous-casting plant to about 250° C. and in the case of coils from the coil winding temperature to, for example, 250° C., wherein the heat-transfer medium, for example, thermal oil, salt melt or another heat-transfer medium, is heated to >100° C.

Particularly advantageously, the transport of the heat-transfer medium from the heat exchanger to the power-generating plant is carried out in a heat-transfer line, which is operated in a quasi pressureless manner (only the pump delivery pressure prevails therein and/or a liquid medium is used which preferably does not build up steam pressure above 2 bar) and in which liquids at high temperature, in particular in the temperature range between 250° C. and 400° C., can be used.

The heat exchangers are connected to one another in series or in parallel and to a power-generating plant provided in the vicinity of the continuous-casting plant, of the slab or coil-storage area, by transport lines. An ORC or Kalina installation is preferably used as power generation plant, in which with a steam-operated turbine with flanged generator the heat stored in the heat-transfer medium is transferred with heat exchangers and converted into electric energy. The working medium of the power-generating plant is generally not water, but ammoniac water mixtures, carbon dioxide, silicone oils, hydrocarbons, fluorohydrocarbons or other media, which evaporate or condense at lower temperatures and pressure, so that a closed cycle is also possible at low temperatures or lower energy supply at low pressure. The conventional temperature ranges for the two power generation methods are for the Kalina process about 95° C. to 190° C. and for the ORC process about 95° C. to 400° C. (differing slightly depending on the manufacturer and working medium). In contrast to a water-operated steam turbine cycle, for example, the ORC installation is less complex, it requires lower maintenance costs, is operated at lower pressure and is excellently suitable for part-load operation. That is why an ORC installation is preferably used. However, if a large-scale plant with high energy quantity is possible and high temperatures constantly occur and a high pressure is accepted in the power generation installation, alternatively a water-operated steam turbine installation can also be used for power generation.

The flow volume of the heat-transfer medium and thus the temperature thereof are set depending on the billet, slab or coil temperature as well as depending on the size and design of the heat exchangers via thermally insulated transport lines with adjustable feed pumps and/or mixing valves and flow control valves. The temperature of the heat-transfer medium is regulated with a change of the flow volume. The object is to adjust the highest possible temperature of the heat-transfer medium.

For the stored slabs or slab stacks it frequently should be possible to adjust targeted cooling rates. This is advantageously achieved in that different heat exchanger target temperatures or the temperature of the heat-transfer medium of the selected heat-transfer locations are set. These target temperatures can be changed suitably via the cooling time in order to be able to also dynamically adjust predetermined cooling curves for the slabs. A further influence is carried out by the use of temperature-stable fans that generate an airflow inside the heat exchanger locations or pit. In addition to the cooling rate, the temperature distribution can be influenced herewith. If the heat-transfer from the slabs to the heat exchangers is to be reduced, i.e., a much lower cooling rate is desirable with for example certain slab materials, a partial closure or cladding of the heat is exchangers by for example ceramic plates of defined thickness is provided.

Alternatively, the heat of the slabs (or coils, etc.) is first transferred in a storage chamber to a gaseous medium (for example to air), that transports the heat by fans or blowers into a thermally insulated gas transport line (loop line) to chiefly large-area heat exchangers, which in turn absorb the heat and convey it via a heat-transfer line with a liquid heat-transfer medium (for example thermal oil) to the compact heat exchangers of the power-generating plant (for example ORC installation). Depending on the desired heat quantity to be discharged at the heat exchanger and/or the cooling rate of the slabs (or coils, etc.), the throughput performance of the blower in the loop line can be adjusted in accordance with a computer model.

With the use of heat exchangers in the coil and slab-storage areas, heat sources (components) with different temperature level are available. Also different target temperatures are desirable at the different heat exchanger locations for other reasons. The coils or slabs cool in the course of the storage period in the coil and slab-storage area. The coils or slabs produced last have naturally higher temperatures. Despite adjustment of the pump delivery line and/or opening of the mixing valves and flow-control valves, the different heat exchanger units can produce different temperatures of the heat-transfer medium (for example thermal oil).

The continuous-casting plant likewise supplies inlet temperatures of the heat-transfer medium with different levels. The segment rollers are approved only for lower roller temperatures, depending on the roller material in order not to negatively affect the roller wear and roller strength values. The heat exchangers between the rollers do not have a bearing function and are admitted for higher temperatures.

In order to optimize the efficiency of the power-generating plant (for example ORC installation), this is equipped with one, but preferably with several heat exchangers. For the different heat exchanger circuits to the power-generating plant (ORC installation) therefore different target temperatures are aimed for, which can be increased incrementally. The temperature sources with lower level are used for preheating the working medium in the power-generating plant. For this purpose, for example, the segment roller heat exchanger is used in the continuous-casting plant. The heat exchanger units with lower coil or slab temperature are available for this purpose in the coil and slab-storage area. By the use of shift valves, the heat-transfer medium is conveyed here to the corresponding heat exchanger of the power-generating plant. The highest temperature of the heat-transfer medium is expected at the evaporator heat exchanger. The working medium of the heat generating installation is increased here from an intermediate temperature to evaporating temperature level. This occurs through correspondingly high inlet temperatures of the heat-transfer medium. To this end, the heat exchanger between the segment rollers in the continuous-casting plant is used and in the coil and slab-storage area those with increased coil and slab temperature or, to put it generally, the heat exchanger units of high average heat-transfer temperature Alternatively, the thermal oil flow of a heat exchanger in a thermal oil heater can be correspondingly post-heated somewhat before it is conveyed to the power-generating plant and/or a separate heat exchanger circuit is used from a thermal oil heater to adjust the high temperatures. The heater output of the thermal oil heater is adjusted depending on the heat-transfer temperature Tv measured previously.

Additional other heat sources from the rolling mill or the continuous-casting plant can also be used as preheaters of the working medium of the power-generating plant than those listed above. Steam suction or waste heat from flue gases that have a level of >100° C. are also conceivable, for example.

Advantageously, the heat from the different regions of the metal processing installation and storage regions such as continuous-casting plant, slab-storage area, furnace exhaust gases, etc. can be used and combined at a power-generating plant and conveyed away there. A better utilization of the power-generating plant can be achieved hereby.

Adapted to the different maximum heat-transfer temperatures to be expected in the different heat exchanger circuits, thermal oil types are used in the installation that are adapted thereto in a targeted manner. At lower temperatures simple, low-cost thermal oils are sufficient. Advantageously, the last heat exchanger at the evaporator of the power-generating plant, for example, ORC plant, is operated at the high temperature and thus with, for example expensive synthetic thermal oil.

If the process heat flow is greater than the heat that is removed from the power-generating plant, or the temperature of the heat-transfer medium (thermal oil) threatens to exceed the admissible level despite maximum pump capacity, in this case the excess heat is discharged to an external heat sink (for example air-cooled heat exchanger, cooling tower) or to stationary or transportable heat storage devices, in order not to jeopardize the installation and the heat transport medium.

A process model monitors and controls the cooling process, wherein in particular starting from a measured or calculated billet or slab temperature, the cooling of the slab is calculated depending on the ambient conditions. The longer the slab remains in the heat exchanger, the better the energy utilization. Thus an individual slab here loses for example 600° C. in 5 hours. If the slab tonnage is higher than the throughput that results from the sum of all of the heat exchanger locations, a process model shortens the storage time accordingly.

At the same time, the process model combines the use of the heat exchangers in an expedient manner with the storage and transport system in order, for example, to set or lay the slabs or coils in an ordered manner in the storage area and, when needed, to remove them again selectively for further processing.

A sample calculation makes it clear how much electric energy can be obtained through the use according to the invention of the residual heat of slabs with the aid of heat exchangers:
  utilized temperature range for example 950° C. to 350° C.
  with the heat capacity at 950° C. of about 176 KWh/t and at 350° C. of about 49 KWh/t, a change of the heat capacity results of about 127 KWh/t.
  The efficiency in the conversion into electric energy is η=about 0.1 (low estimated value).
  This results in electric energy of 12.7 KWh/t.
  In the production of a conventional plant of about 3 million tons per year, with the above framework conditions it is estimated that from a slab-storage area a yield of 38100000 KWh per year can be extracted, if all of the slabs are used for obtaining electric energy with the above framework conditions.

If other heat consumers are in the vicinity, such as for example, acid-treatment plants or other strip further processing plants, a part of the billet, slab or coil process heat obtained can alternatively be transported to these heat consumers via a heat transport line. The electric energy is then saved there in an efficient manner.

Analogously, the slab or coil process heat can be expediently and advantageously used for adjacent plants or processes (outside the metal processing plant) such as, for example
  sea-water desalination plants
  drying processes
  district heating building heaters
etc. and increase the total efficiency of the process heat recovery. The process heat can hereby be used directly or the condenser cooling heat of the power generator plant can be used. Thermal oil, air, water or steam is used thereby as transport medium Depending on the desired temperature level.

If an electric supply reliability is to be ensured for the connected electric consumers, a heat storage device is connected to the power-generating plant, which bridges brief interruptions in heat. Furthermore it is provided to install a thermal oil heater, which serves as standby auxiliary heater. The thermal oil heater can be operated with gas (particularly advantageously with blast furnace gas, converter gas, coke gas or natural gas, etc.) or oil and is activated only when the billet, slab or coil heat fails. The thermal oil heater and the power-generating plant are likewise connected to one another so that, for example, thermal oil can flow between the two plants as heat-transfer medium and the heat transport is carried out in this manner. If, for example, blast furnace gas is left, it could be incorporated into a total plant energy strategy or independent strategy.

Each power-generating plant of the type discussed has a condenser. The working medium is liquefied again here. The cooling is carried out there by connection of heat consumers or by the use of additional air-cooled heat exchangers or of a cooling tower. It is particularly advantageous if the cooling can be carried out with the cooling tower of the metal processing plant (continuous-casting plant, rolling mill) that is present anyway. Investment costs are saved hereby and this cooling device is used as well.

Instead of discharging the cooling heat at the condenser of the power-generating plant (ORC plant), it is provided to use (in part) this energy as air pre-heating (or pre-preheating) for the slab furnace or thin slab furnace and to thus save heating energy there. To this end a heat-transfer circuit connects the power-generating plant with the heat exchangers in the air or oxygen intake passage of the slab furnace. Only excess condenser energy of the power-generating plant is then dissipated to the surroundings, for example.

A roller hearth furnace is located after the continuous-casting plant of a CSP plant. Here the slab-storage area is omitted, the slab instead is transported further in a roller hearth furnace. The losses in the roller hearth furnace, which are discharged via the furnace rollers, are relatively high. This results in another application case. In order to reduce the losses, analogously to the example cited of a transport roller heat exchanger, it is provided to cool the furnace rollers with thermal oil instead of water and in addition to use this lost heat for power generation. Thermal oil makes it possible to cool at higher temperatures without steam generation in the cooling circuit having to be expected. The furnace rollers in particular the disks of the furnace rollers thus reach a higher temperature and thereby lead to lower heat losses. The maximum thermal oil temperatures are thereby adapted to the furnace roller materials used. In addition to the normal use of the waste gas temperatures downstream of the is recovery systems for make-up gas preheating for the slab furnace, further heat exchangers for energy recovery are also installed in the exhaust gas duct and these are likewise connected to the power-generating plant. Through the advantageous combination of the roller cooling heat and the exhaust gas energy, which are fed to the power-generating plant via heat exchangers and heat-transfer lines in the known manner, a heat recover and power generation with worthwhile heat quantities can also be carried out economically for CSP plants and the losses there can be reduced.

The described technology is not limited only to conventional hot strip plants with thick slabs or thin slabs, but can also be used in the same manner in ingot steel, billet steel, backing steel or round steel production etc. This technology can also be advantageous in nonferrous plants (strip installations etc.).

An essential aspect of the invention lies is that preferably a heat-transfer medium is used, which transfers in a quasi pressureless manner the thermal energy from the heat exchanger of the heat source to the heat exchanger of the power-generating plant or to other heat consumers. This was quantified above in that it is preferably provided that the pressure of the heat-transfer medium corresponds only to the pump delivery pressure to overcome the flow losses in the heat exchangers and transport lines and/or a liquid medium is used that preferably does not build up steam pressure above 2 bar. In special cases, for example special thermal oil can build up a somewhat higher steam pressure. However, the operating pressure is much lower than with water or steam at comparable temperature. At any rate it is preferably not provided that the heat-transfer medium is conveyed through the heat exchangers and a line system under high pressure. This is also very advantageous under safety aspects.

The heat-transfer medium can thereby have high temperatures and thus increase the efficiency of the power-generating plant.

Thermal oil is preferably used as a heat-transfer medium.

It is advantageous thereby if instead of a conventional steam circuit process an ORC plant is used.

BRIEF DESCRIPTION OF THE DRAWING

Further advantages and details of the invention are explained in more detail below based on illustrated embodiments shown in diagrammatic drawing figures. Therein:

FIG. 6a is a plan view of a slab heat exchanger arrangement in a holding pit, FIG. 6b is a sectional side view of a slab heat exchanger arrangement in a holding pit, FIG. 9a is a plan view of an endwise slab-storage area, FIG. 9b is a sectional front view of an endwise slab-storage area, FIG. 11a shows a roller conveyor with arrangement on both sides of rollers constituted as heat exchangers, FIG. 11b shows a roller conveyor of FIG. 10a with heat exchanger plates provided between the rollers, FIG. 13 shows segment roller embodiment variants, FIGS. 14, 15, 15a and 15b show heat exchangers between the segment rollers, FIG. 16 show the use of several heat exchanger circuits with different heat sources and in part the power-generating plant, FIG. 20a shows a heat-exchanger pipe with turbulence plates in perspective view, show partially in section, FIG. 20b shows a heat-exchanger pipe with turbulence plate in front view, FIG. 20c is a cross section through a twisted, specially profiled heat-exchanger.

DETAILED DESCRIPTION

Figure 1:
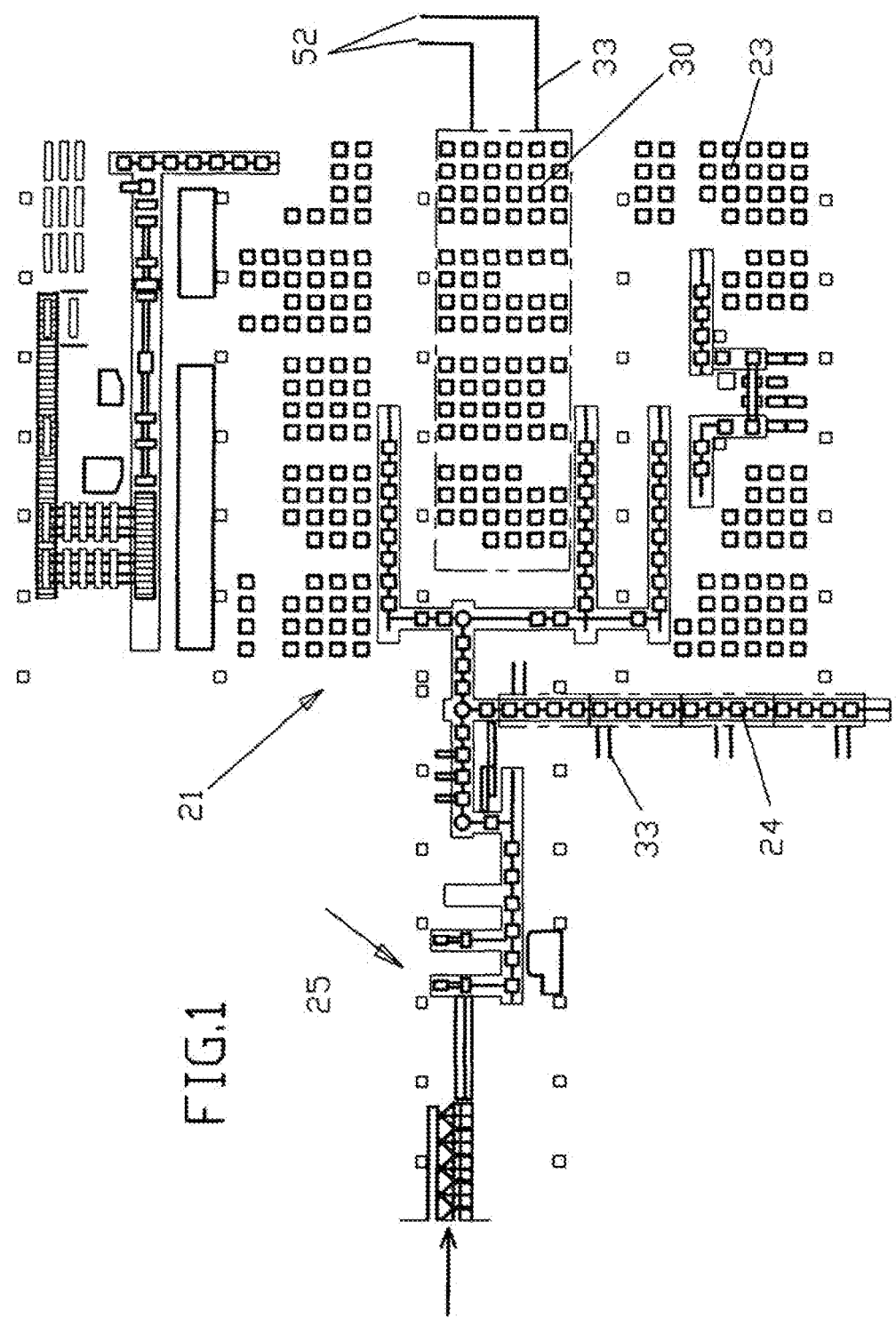
FIG. 1 is a plan view of a coil-storage area.

FIG. 1 shows a coil-storage area 21 in a plan view. The coils produced by an uncoiler 25 reach their storage locations via a coil transport line 24, which can be provided, for example, with heat exchanger hoods or heat insulating hoods. In part these storage locations are constituted according to the invention as storage areas 30 with heat exchangers 31 (see FIGS. 8a and 8b), the rest are conventional coil storage areas 23 without heat exchangers. Depending on the temperature still present and the cooling progress of the coils, an exchange of the coils takes place controlled by the process model between the storage areas 23 and the storage areas 30. The heat-transfer medium heated in the storage areas 30 then reaches the power-generating plant (the power-generating plant is not shown) via heat-transfer transport lines 33 and a heat-transfer manifold 52 or can be conveyed further to internal or external heat consumers (for example further strip-processing plants, sea-water desalination plants).

Figure 2:
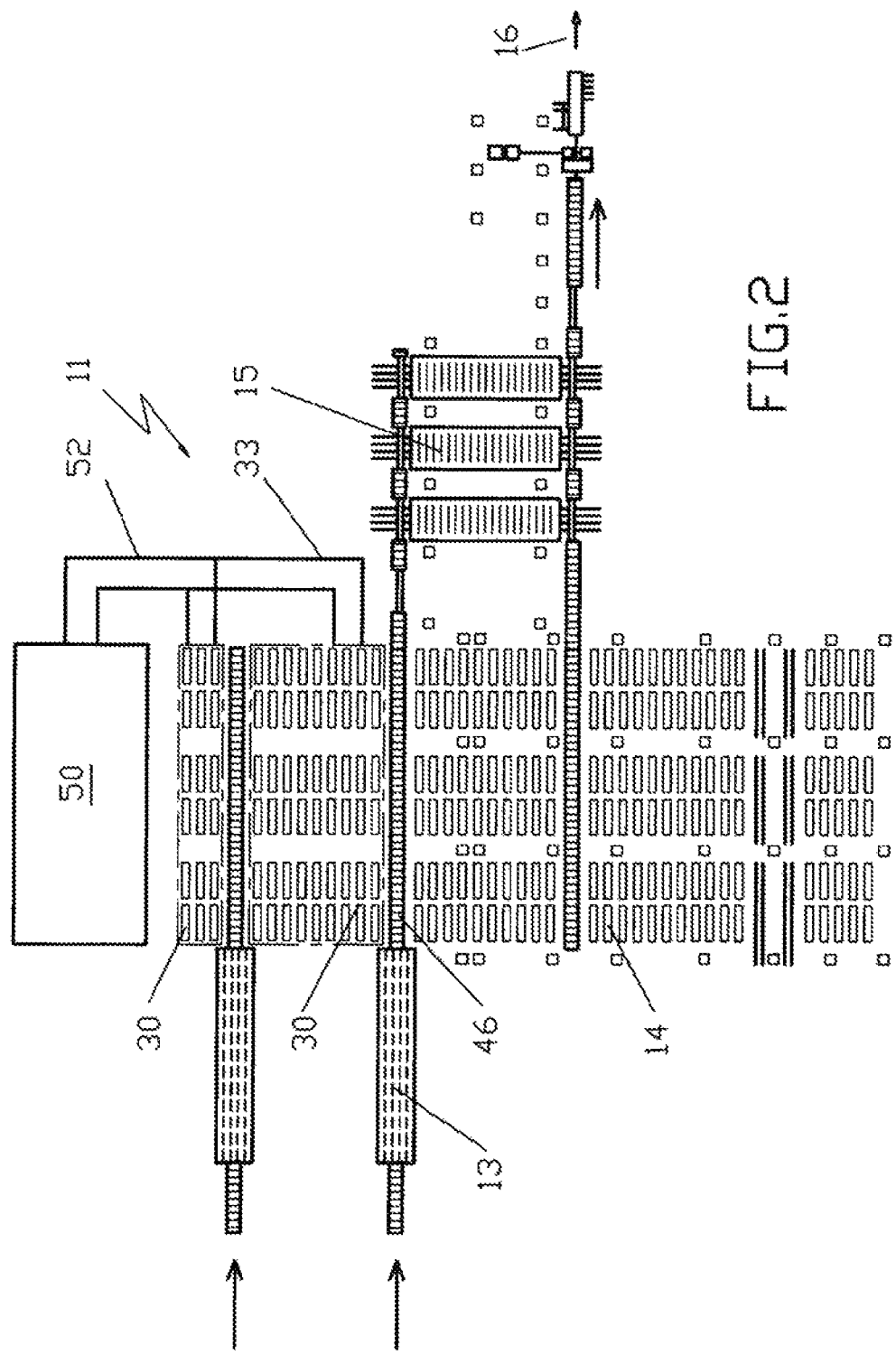
FIG. 2 is a plan view of a slab-storage area.

FIG. 2 shows a slab-storage area 11 in plan view constituted according to the same principle as the coil-storage area 21 of FIG. 1. The slabs are transported from the continuous-casting plant via heat-insulated roller conveyors 13 constituted as heat exchangers or heat-storage devices into the slab-storage area 11. In the slab-storage area 11 a part of the storage areas are constructed just as in the coil-storage area 21 according to the invention as storage areas 30 with heat exchangers 31, while the remaining storage areas 14 are conventional storage areas without heat exchangers. Depending on the slab temperature still present and the cooling progress, a controlled exchange of the slabs by the process model takes place here too between the storage locations 14 and the storage areas 30. The heat-transfer medium heated in the storage areas 30 then reaches the power-generating plant 50 in the same way via heat-transfer transport lines 33 and a heat-transfer manifold 52. The slabs cooled on the conventional storage locations 14 and the slabs cooled on the storage areas 30 are then removed from the slab-storage area 11 for further production controlled via the process model and via heating furnaces 15 in the transport direction 16 to the rolling mill. The slab-sorting and slab-planning model and the process model for optimizing the energy yield are coupled to one another.

Figure 3:
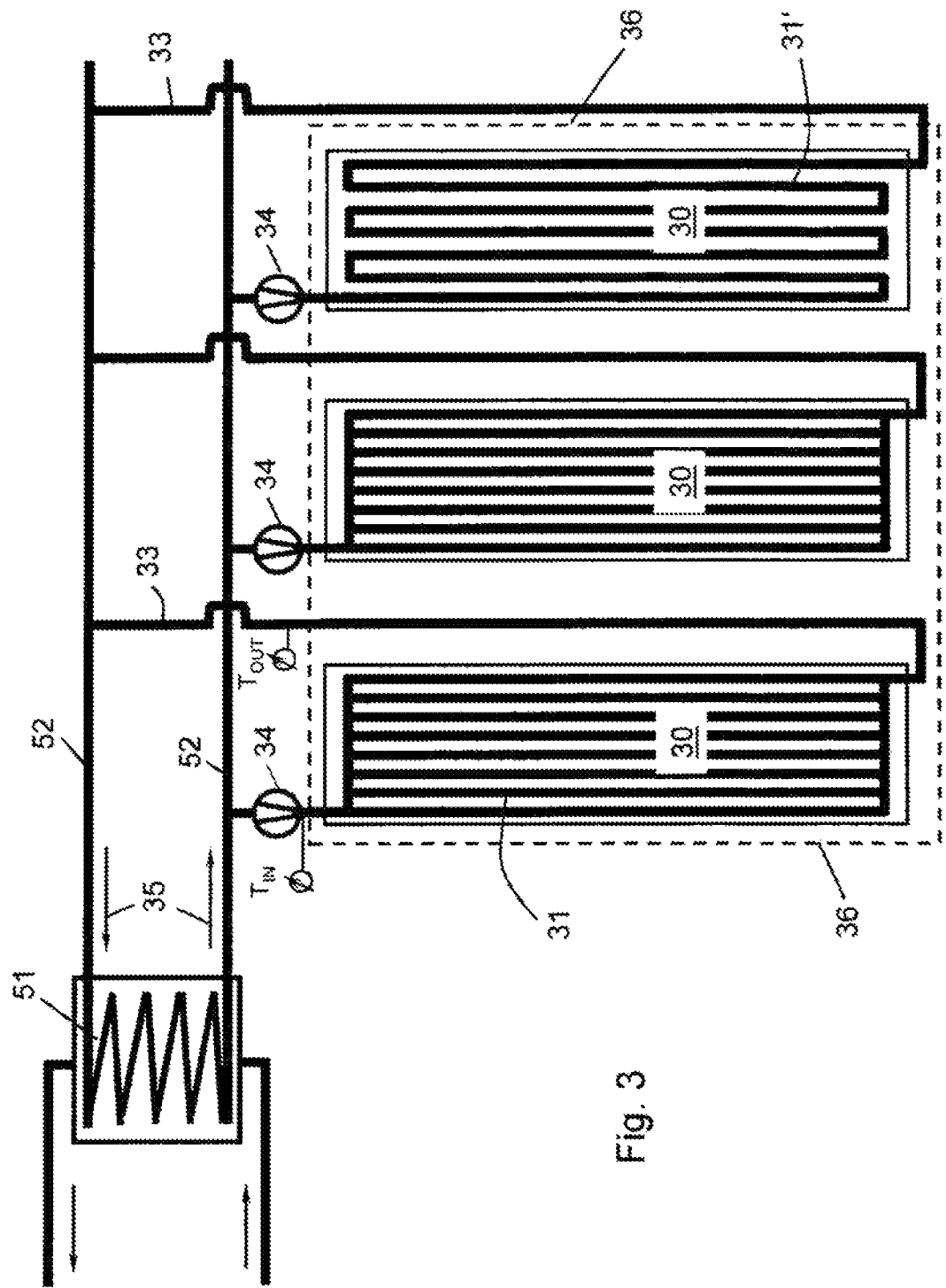
FIG. 3 is a plan view of three slab storage areas.

The storage region shown by dashed lines in FIG. 2 with storage areas 30 is emphasized enlarged in FIG. 3 in a plan view by way of example. In this representation three storage areas 30 are provided extending parallel next to one another. The three storage areas 30 are jointly covered with a pivotable or displaceable insulating hood 36 (only the dashed outline 36 is shown). Each storage area 30 contains heat exchangers 31 or 31', which are located above and below and optionally next to the introduced slabs (not visible here) and which are connected to a manifold 52 via heat-transfer transport lines 33. A feed pump 34, which is assigned to each storage area 30 in the illustrated embodiment, ensures by a continuous measurement of the inlet and outlet temperature of the heat-transfer medium at the heat exchanger 31 an optimum cooling with optimum utilization of the residual heat established by the process model and the highest possible temperature of the heat-transfer medium by individual conveyor speed of the heat-transfer medium. Alternatively, several heat exchangers 31 can also be connected in series and supplied by a feed pump 34. The heated heat-transfer medium then reaches the preheater or evaporator 51 of a power-generating plant, for example an ORC plant, via the manifold 52.

Figure 4:
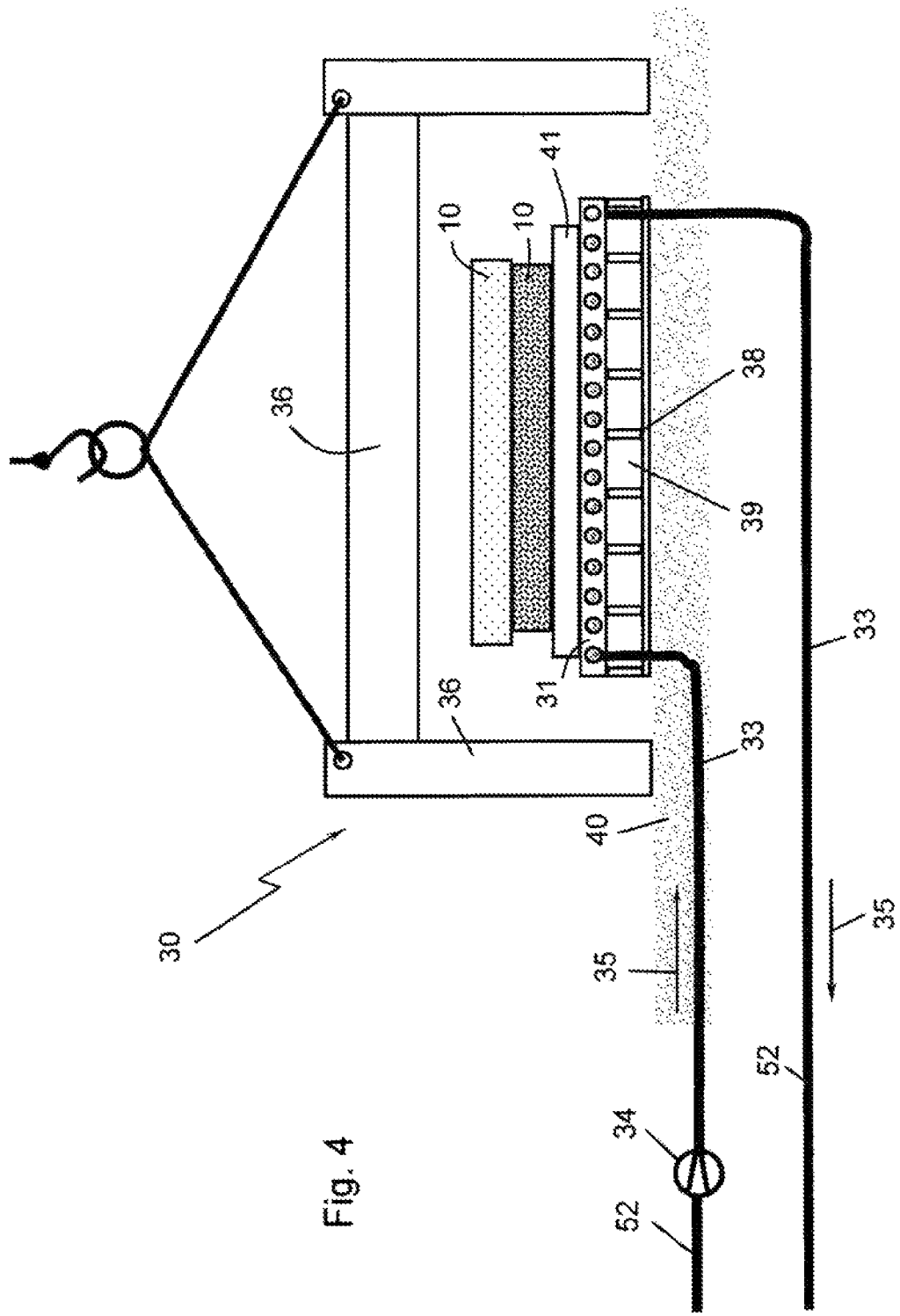
FIG. 4 is a sectional side view of a slab storage area with an insulating hood that can be lowered.

A storage area 30 provided with an insulating hood 36 indicated by dashed lines in FIG. 3 is shown in a sectional side view in FIG. 4 by way of example. The insulating hood 36 covering the storage area 30 can be pivoted aside for slab handling or moved by a crane, as shown diagrammatically in the figure. The storage area 30 is provided with a lower heat exchanger 31 bearing against support ribs 38 and provided on a base plate 40 of cement, for example. A carrying rail 41 is located here between the heat exchanger 31 and the slab 10. In order to largely reduce energy losses, fixed thermal insulation 39 is located under the heat exchanger 31 and inside the insulating hood 36 there is thermal insulation not visible here. Since the insulating hood 36 is adjustable in height, several slabs 10 can also be stacked one on top of the other in these storage areas 30. The heat exchanger 31 is connected via insulated heat-transfer transport lines 33 and a feed pump 34 is connected to a thermally insulated manifold 52, through which the heated heat-transfer medium is conveyed in the transport direction 35 from and to the power-generating plant (not shown).

Figure 5:
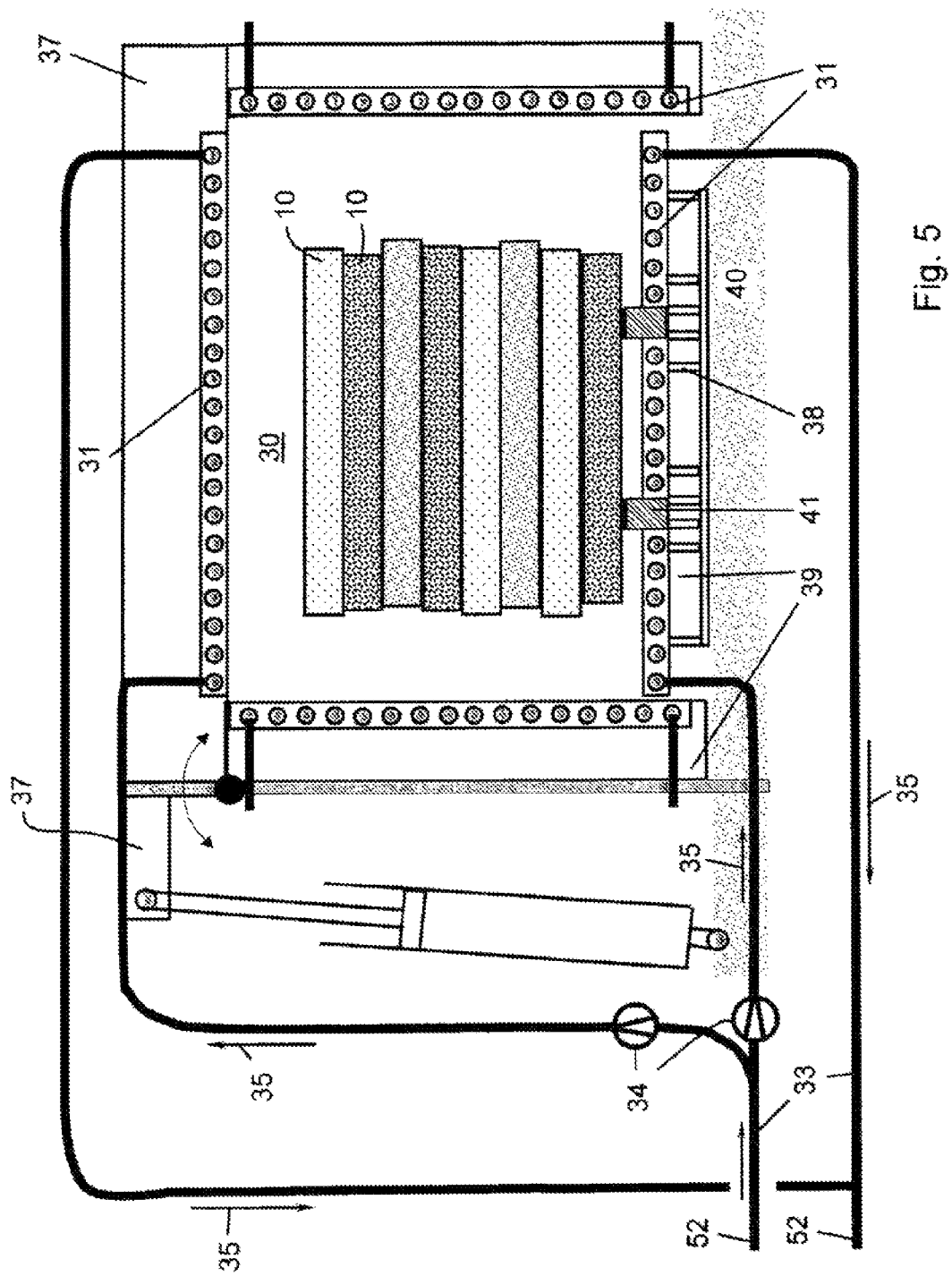
FIG. 5 is a sectional side view of a slab storage area with a pivotable upper heat exchanger.

FIG. 5 shows in a sectional side view a storage area 30 covered by a thermally insulated hood 37 that can be pivoted or moved for slab handling, and that has an integrated heat exchanger 31. In addition to a heat exchanger 31 provided on the base, further heat exchangers 31 are provided on both sides or on all four sides of the storage area 30, so that this storage area 30 is completely surrounded by heat exchangers. In the same manner as the illustrated embodiment of FIG. 4 this storage area 30 is provided on carrying rails 41 and support ribs 38 and fixed thermal insulation 39 on a base plate 40 of cement, for example, and its heat exchangers 31 are connected via insulated heat-transfer transport lines 33 and a feed pump 34 and an insulated manifold 52 to a power-generating plant. One slab can be deposited for each storage area 30, or in order to save storage areas, several slabs 10 can be stacked one on top of the other as shown. Each storage area 30 can be provided with its own hood 37 or alternatively a large hood 37 is used that covers several storage areas 30 next to one another, in order to save pivot mechanisms, such as hydraulic cylinders, for example.

A typical preferred embodiment of this type for the arrangement of several storage areas 30 next to one another is shown in the form of a holding pit in FIG. 6a in plan view and FIG. 6b in side view. As a rule, cooling speeds are set in a targeted manner in holding pits for the stored slab stacks. This can be achieved by adjusting different heat exchanger target temperatures or temperature of the heat-transfer medium of the selected heat exchanger locations. These target temperatures can be changed in a targeted manner via the cooling time in order to be able to dynamically set predetermined cooling curves for the slabs 10. The slabs 10 bear in the longitudinal direction against carrying rails 41. The slabs can be removed individually here by displaceable cover plates 37. Alternatively, the cover plates 37 can also be pivoted upward. Heat-exchanger pipes or plates 31 (see FIG. 6b) are provided on the base, on the wall and optionally on the ceiling and if necessary between the individual slab stacks (not shown). Instead of dissipating the energy to the surroundings via forced convection, it is transferred to these heat exchangers 31 in a targeted manner. The outer surfaces of the pit are thermally insulated by an insulation plate 39. The insulation below is carried out by support ribs with integrated insulation plates 38, 39. The connection lines to the power-generating plant are not shown.

In order to influence the convective heat transfer depending on the material, slab stack height and temperature level, here airflow inside the pit is generated with temperature-resistant fans 67. The cooling speed and temperature distribution in the pit can be influenced herewith at the same time. If the heat-transfer from the slabs 10 to the heat exchangers 31 is to be reduced, i.e. with for example certain slab materials a much lower cooling speed is desired, a partial closing or cladding of the heat exchangers 31 by for example ceramic plates (not shown) of defined thickness is provided.

Figure 6C:
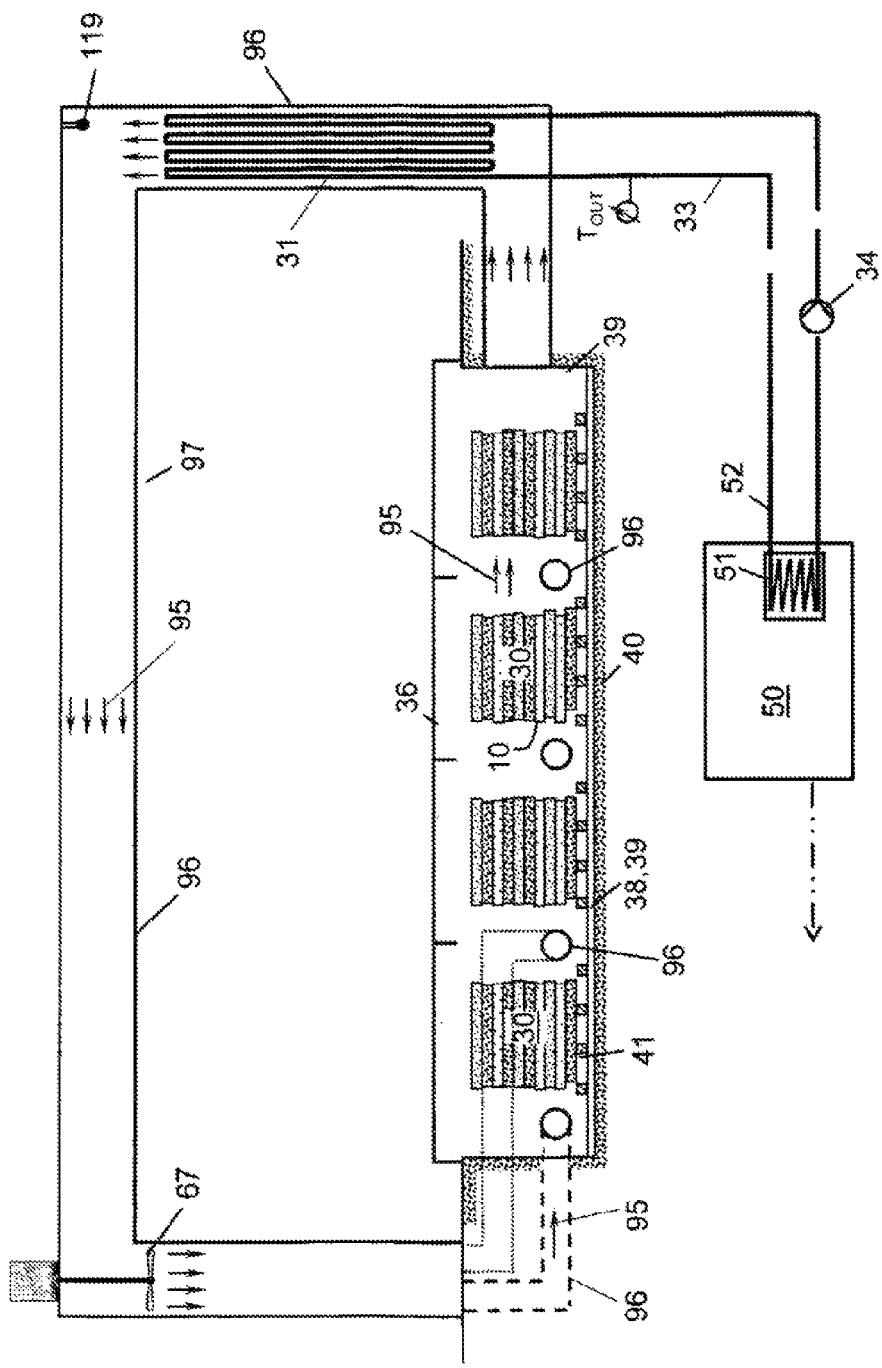
FIG. 6c is a side view of a slab heat exchanger arrangement with heat exchanger loop lines.

Instead of arranging heat exchangers around the slab stack, the slabs 10 can be stored in an insulated space (for example in a holding pit), through which via a loop line 96 (gas transport line, heat exchanger duct) a gaseous medium (for example air) flows, as is shown in the illustrated embodiment according to FIG. 6c. Herewith the aid of a blower 67 a forced flow 95 (gas flow, air flow) is generated through the slab storage space, the heat exchanger duct 96 or several small pipe ducts and back. Alternatively, for special cases the exhaust air can also be discharged into a shaft with the heat exchanger 31. The loop line avoids waste air heat losses, however. In the loop line 96 the air transfers the thermal energy to one or more of the heat exchangers 31. In a separate heat-transfer transport line 33 filled with thermal oil for example, the heat flow is first collected under some circumstances from several heat exchanger units (manifold 52) and then discharged to the power-generating plant (for example ORC plant) 50 via the heat exchanger 51 there.

The slab-storage area can be constructed in the form of a holding pit or can be provided on level ground. As shown in FIG. 6c—several slab stacks 30 or also individual slab stacks 30—in special cases individual slabs—can be provided in an area, through which respectively separately in a loop line a gaseous medium (for example air, flue gas, nitrogen) is blown through.

In order to increase the convective heat-transfer from the slab or slab stack to the air, radiator plates (not shown) can be mounted next to the stacks or as wall cladding. The radiator plates absorb the radiant energy of the slabs, heat up and increase the heat-exchanger surface for the convective heat-transfer to the circulating gaseous medium (for example air) and thus increase efficiency.

Particularly advantageously, the cooling speed of the slabs can be controlled with the blower 67 as control element. Furthermore, an adjustment of the blower output depending on the slab temperature is possible. In addition the temperature of the gaseous medium can be set downstream of the heat exchanger 31 depending on the conditions at the power-generating plant or other target specifications.

It is proposed to use an analogous procedure for coils, billets, wire stacks, etc. in their storage areas.

In special cases, the energy can be discharged via a gas flow 95, instead of to the heat exchanger 31, directly to a heat exchanger 51 of the power-generating plant (ORC plant) 50 specially prepared for this purpose.

Figure 7B:
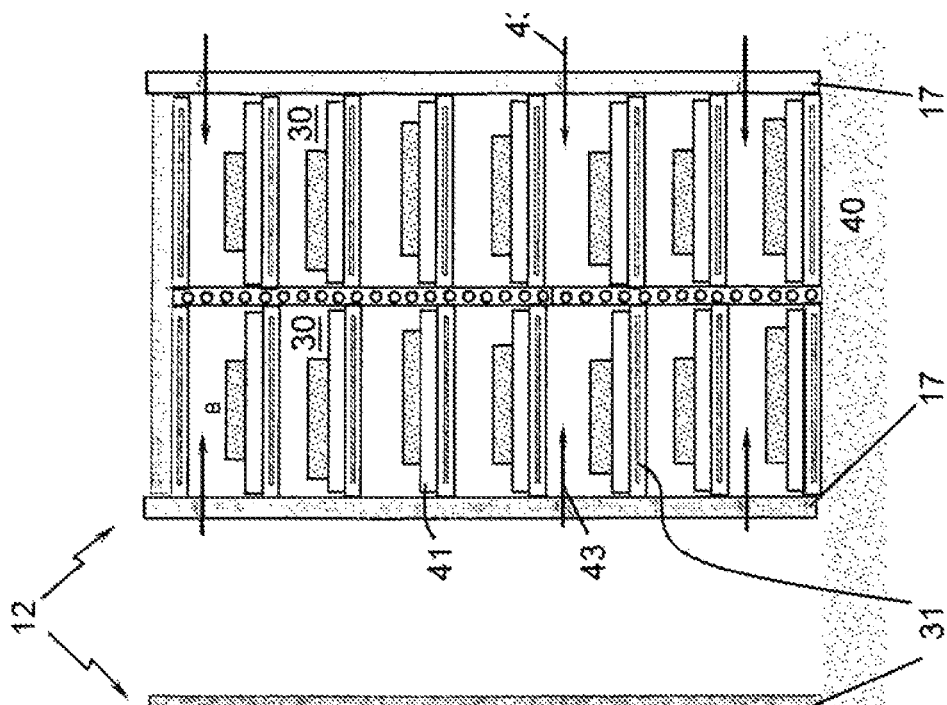
FIG. 7b is a sectional side view of a slab high-bay storage area.
Figure 7A:
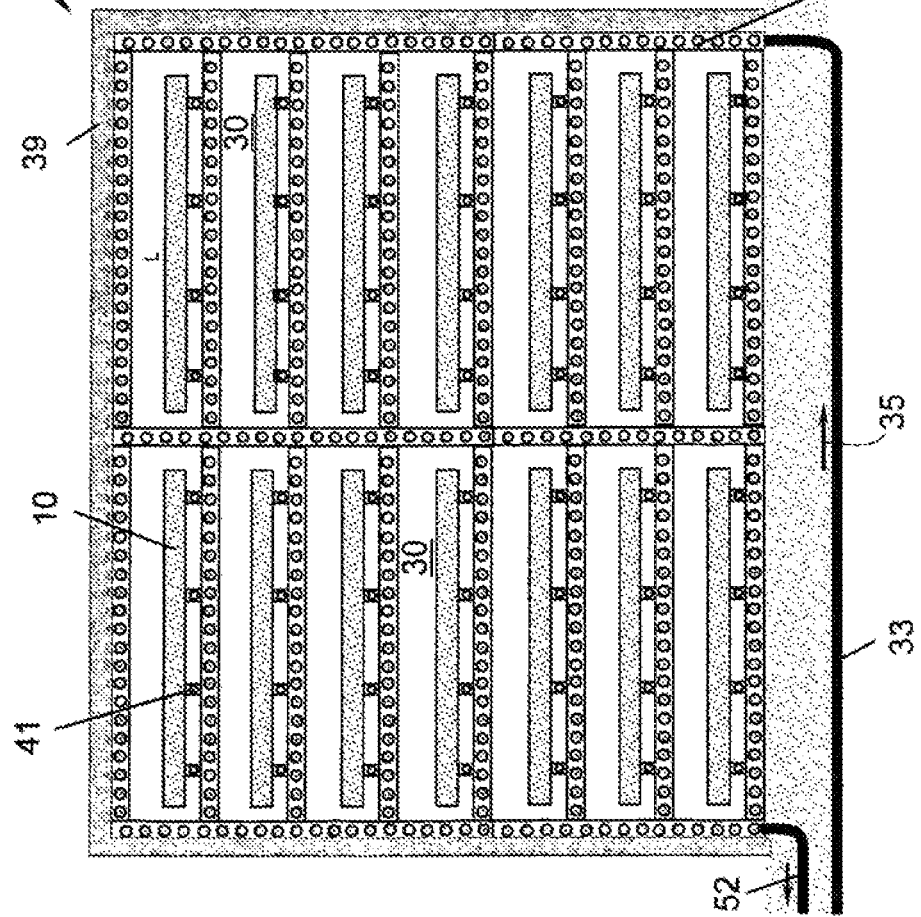
FIG. 7a is a sectional front view of a slab high-bay storage area.

FIGS. 7a and 7b show a slab high-bay storage area 12 in a sectional front view and a sectional side view, in which the most compact and cost-effective storage can be carried out. The slabs 10 are inserted flat horizontally in the filling direction 43 into the storage areas 30, for example, with a stacker (not shown), to which end the slab high-bay storage area 12 is provided with side doors 17 moveable in sections. Inside the slab high-bay storage area 12 the slabs 10 lie on carrying rails 41. Heat exchangers 31 are integrated into the bearing walls and ceilings, so that the supporting parts do not heat up too much and the stability is thus maintained. All of the heat exchangers 31 are connected to one another via insulated heat-transfer transport lines 33 in part in a parallel manner or in series and via a manifold 52 to a power-generating plant.

Figures 8A, 8B:
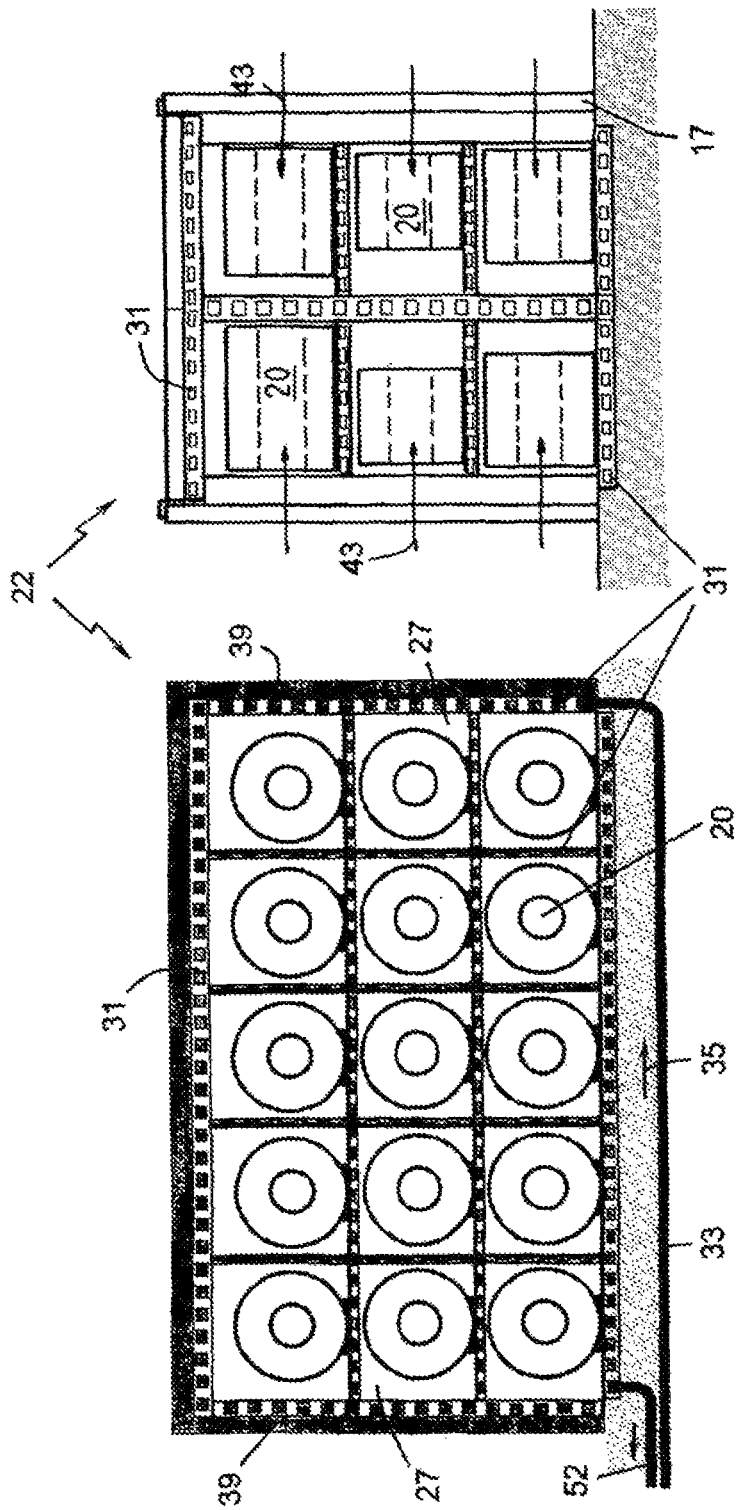
FIG. 8a is a sectional front view of a coil high-bay storage area.
FIG. 8b is a sectional side view of a coil high-bay storage area.

In approximately the same manner as the slabs 10 in the illustrated embodiment of FIGS. 7a and 7b, coils 20 can also be stored for cooling in a high-bay storage area, as is shown in FIG. 8a in a sectional front view and FIG. 8b in a sectional side view. The coil high-bay storage area 22 shown does not differ in structural terms from the slab high-bay storage area 12, so that the reference numbers listed here can be applied to the coil high-bay storage area 22. The options exist for the coil high-bay storage area 22 that the coil compartments 27 shown for stability reasons can also be provided laterally offset to one another and hexagonal coil compartments 27 are also possible in addition to rectangular ones.

An alternative option of slab storage lies then in storing the slabs 10 in storage areas 30 of an endwise slab-storage area 18. An endwise rack of this type is shown in a plan view in FIG. 9a and in a sectional front view in FIG. 9b. For storage the slabs 10 are tilted up, placed on their wide side and then pushed on end from the side into the storage areas 30 of the endwise slab-storage area 18. The loading direction is shown in FIG. 9a by an arrow 43. Due to the larger packing density of the endwise storage with heat exchangers 31 provided between the slabs 10, an intensive heat-transfer from the slabs 10 to the heat-transfer medium in the heat exchangers 31 takes place with low losses. In order to combat energy losses, the entire endwise slab-storage area 18 is enveloped by a fixed thermal insulation 39 and in sections a moveable thermally insulated door 17 is present, which as needed can be displaced in the transport direction 17'. The slabs 10 placed on edge rest for example on rollers 42 or supports constituted in another manner, through which a lateral insertion and removal of the slabs 10 in the endwise slab-storage area 18 is facilitated. For lateral guidance and tilt securing of the slabs 10 supports, for example, rollers 19 are also provided laterally here on the heat exchangers 31, by which likewise easier displacement of the insertion and removal of the slabs 10 is rendered possible. The pipelines of the heat exchangers 31 are connected to one another and via a manifold 52 to a power-generating plant, not shown.

Figure 10:
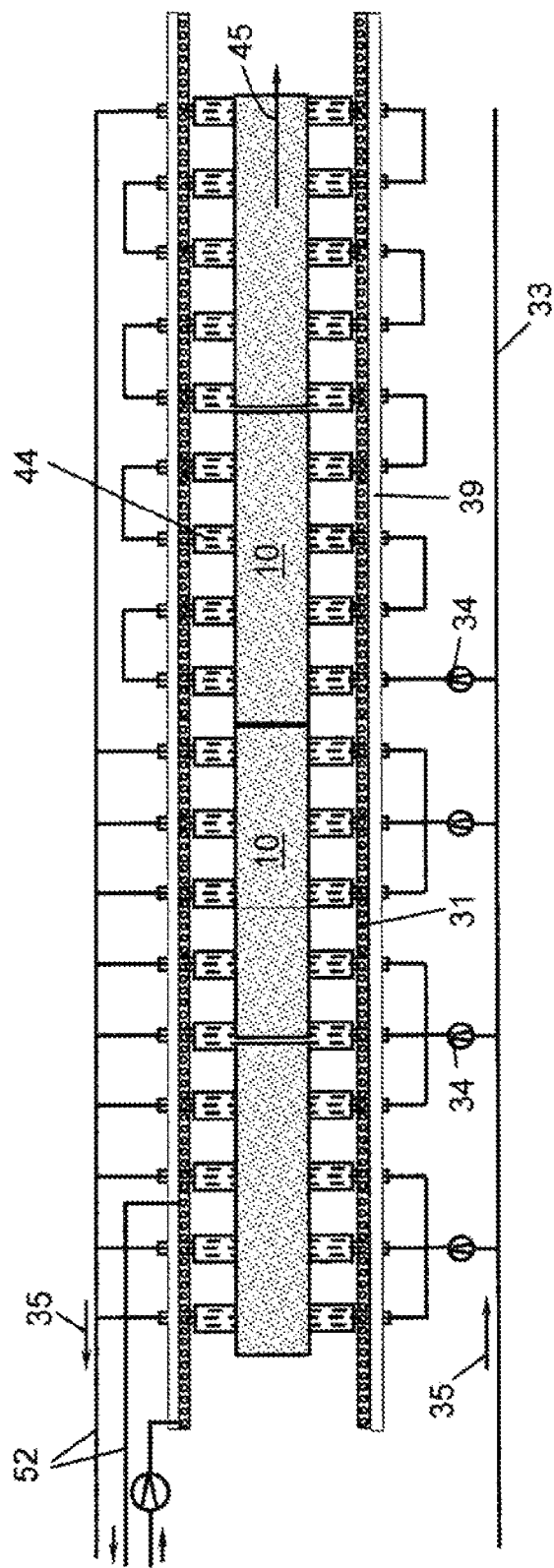
FIG. 10 shows a thermally insulated roller conveyor with transport rollers constituted as heat exchangers.

In order to avoid heat losses during the transport of the slabs 10 as far as possible and/or to collect the energy, the transport rollers 44 are constituted as heat exchangers, as FIG. 10 shows in a sectional plan view. These roller heat exchangers can have different embodiments, for example 56, 57 or 58 (also as segment roller with, for example turret cooling bore with one-sided rotating media supply for the feed and discharge). In the illustrated embodiment shown three transport rollers 44 are connected to one another via the insulated heat-transfer transport line 33, wherein for each a feed pump 34 pumps the heated heat-transfer medium of these three transport rollers 44 to the manifold 52. Alternatively, a feed pump 34 can convey the heat-transfer medium through several transport rollers with alternating flow direction one after the other, which is shown on the right in FIG. 10. Longer heat exchangers 31 are located laterally on the walls, the ceiling and on the base of the transport rollers 44, which likewise are connected via a separate feed pump 34 to the manifolds 52. Through these longer heat exchangers 31 as well as through fixed thermal insulations 39, the roller conveyor is housed such that it practically has the function of an inverse roller hearth furnace, through which slabs 10 cut to length as shown or "endless slabs" are transported.

For the purpose of further intensification of the heat-transfer from the slab to the heat exchanger medium, during transport of the slab, as an alternative, the arrangement on both sides of heat exchanger transport rollers 44 below and pure heat exchanger rollers 44' above are shown in the side view of FIG. 11a. The heat-transfer medium is pumped through the rollers 44 analogously to FIG. 10. In addition, very symmetrical heat dissipation is produced in this manner through roller contact, radiation and convection on both sides. The gap between the rollers 44 is advantageously minimized. The rollers 44 can be pivoted away from above the slab 10 and in part also below as needed, in order to change the heat flow from the slab 10 to the rollers depending on the slab material. The rollers 44 are surrounded by a thermally insulating housing 39 that optionally likewise can be constituted as a heat exchanger 31.

The heat-exchanger arrangement according to FIG. 11b serves as a further alternative for the intensification of the heat-transfer. Here larger roller spacings are set on both sides. Heat exchangers 31 are provided between the rollers 44 and 44'. Also heat exchangers 31 can be provided only on the top that can be constructed in a pivotable, moveable or fixed manner. The heat exchangers 31 can be spaced from the slab 10 or can be constituted as a plate and pressed with slight pressure for the purpose of better heat-transfer against the moving slab 10. Thermal insulation 39 is provided behind the rollers 44, 44' and the rear of the heat exchangers.

With a longer design of the roller conveyor with combined heat exchangers according to FIGS. 10 and 11, gaps are provided between the units so that the slabs 10 for logistical reasons or for roller program planning, etc. can be removed from the heat exchanger line (pushed off, lifted out).

Another option for using heat quantities already generated during slab solidification, lies in using the embodiment according to the invention of transport rollers already in the continuous-casting plant and the segment rollers used under the ingot mold for supporting and conveying the cast billet or the slab as heat exchangers.

Figure 12:
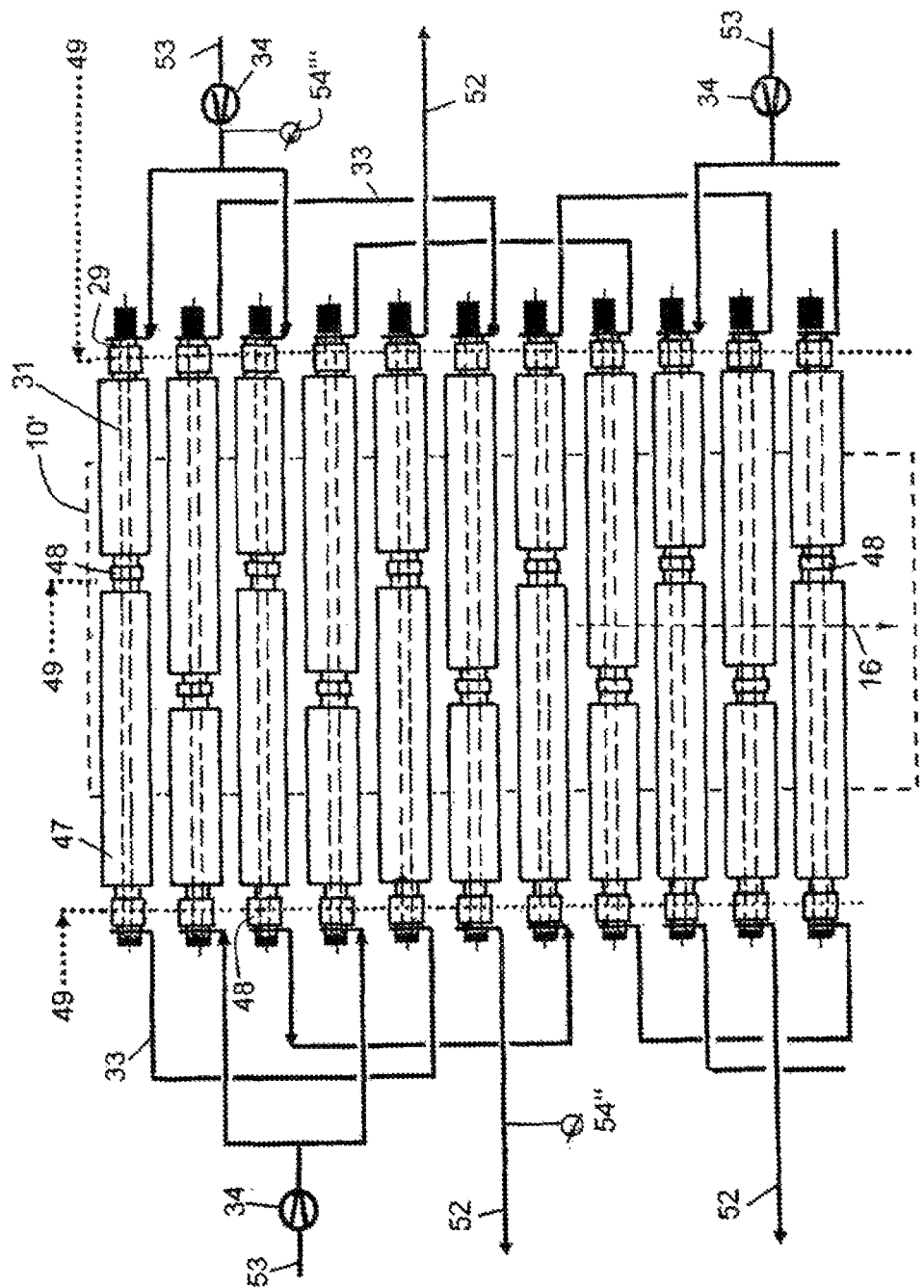
FIG. 12 shows segment rollers as heat exchangers.

FIG. 12 shows the diagrammatic representation of the segment rollers 47 constituted as heat exchangers 31 and the lines 52, 53 from and to the heat recovery plant and the connecting pipelines 33 via media bushings 29 to the segment-roller coolers 56, 57, 58. In the embodiment shown several feed pumps 34 are used for different segment roller groups. The segment rollers 47 are here traversed by thermal oil, for example. The feed with colder thermal oil from the return of the heat recovery plant is carried out usually in the upstream continuous-casting plant region, the thermal oil being pumped alternately from one side to the other through the billet rollers. In order to achieve the highest possible furnace temperatures, the thermal oil is alternately conducted several times from left to right and vice versa through the segment rollers 47. The thermal-oil outlet temperature or the return temperature 54" to the heat recovery plant can be influenced by the selection of the oil transport quantity of a feed pump 34. The maximum admissible thermal oil temperature is, for example about 320° C. This target temperature is ensured by establishing the number of heat exchangers that are used successively, as well as by the feed rate of the thermal oil. To monitor the thermal oil temperature, temperature-measuring devices are provided in the forward and return line 52, 53 and in part between the segment rollers 47.

The fixed piping or hose lines 33 for the flexible connection of the segment rollers 47 lie far outside the billet region and are thermally shielded, as well as also against possible breakthroughs. The media rotating feeds 29 are likewise shielded thermally and against the ambient air. In possibly endangered regions, in addition water sprayers are provided in order to extinguish a fire, and oil-shield plates are provided so that in the event of a leak oil does not run toward the billet. Leak and pressure monitoring are also provided.

The outer storage areas 48 are cooled by a separate storage-area cooler 49. An insulating layer between the storage area and heat exchanger reduces the heat loss in this region and protects the storage area from excessively high temperature. The middle storage area 48 can here also be constituted as a storage area half-shell, in order to support the shell to the outside. This storage area 48 has good emergency running properties so that higher storage area temperatures are admissible here.

FIG. 13 shows different possible embodiments or segment-roller coolers in a sectional side view and next to it in each case in cross section. In the direction 59 of arrow with increasing energy supply or increasing heat exchanger efficiency these are from top to bottom a segment roller 47 with central cooling bore 56, a segment roller 47 with turret cooling bores 57, a segment roller 58 with material cooling bores 58, and another segment roller 47 with bores 57'.

Instead of running through the segment rollers 56, 57, 58 from one side to the other, segment rollers can be provided with the combined feed and discharge of the heat-transfer fluid on only one side (for example segment rollers with turret cooling bores with one-sided media rotating supply).

The segment rollers 57 can also be constructed such that the pipe lines are run through successively (to and fro) during turret cooling before the heat-transfer medium leaves the roller again on the inlet side or the opposite side.

The spacing A of the segment roller cooling bores of the is turret cooling 57 or in the jacket segment roller cooling 58, for the purpose of the optimization of the heat-transfer, should be made as small as possible. The spacing A is <40 mm between the segment surface and cooling wall on the side lying outside.

A further advantageous structural embodiment of absorbing the heat of the cast billet 10' and transferring it for the purpose of energy recovery for example to a power-generating plant, is shown in FIG. 14 in a sectional side view. Instead of using the segment rollers 47 as heat exchangers, here heat exchangers 31 are provided between the segment rollers 47.

The heat exchanger surface between the segment rollers can occupy approx, 50-60% of the radiating surface in the continuous-casting plant. Through special arrangement of the heat exchangers 31, the segment rollers 47 are mostly shielded from the slab heat, so that here a lower thermal stress of the segment rollers takes place. The heat exchangers 31 can be constituted as a plate in which the single-row or double-row heat-exchanger pipes are drilled. The rear of the heat exchanger 31 (the side facing away from the slabs) is constructed in a thermally insulated manner. The insulating cassette 39 is here composed of a closed sheet-metal case with an insulating material inner filling. The insulating material is protected from water. Alternatively, the heat exchanger can be composed in an open manner of pipes provided next to one another with or without webs. The billet segment shown should be moved dry as far as possible, as shown on the left side of FIG. 14. Maximum heat yield is achieved this way.

However, if alternatively a billet outer cooling should be necessary, a combined or alternative use according to the example shown on the right in FIG. 14 is possible. As needed, here the existing spray cooling 28 can be activated if for metallurgical reasons it is necessary to influence the slab temperature or for is safety reasons.

In the illustrated embodiment, water is sprayed into the gap between segment rollers 47 and the heat exchanger plate 31 and then runs along between the heat exchanger plate 31 and the cast billet 10' and thus cools the cast billet 10'. Alternatively, a slot can also be provided in the heat exchanger plate 31, through which the water jet is sprayed onto the cast billet 10'. If the heat exchanger is composed of several pipes running transversely, spraying can be carried out with the billet outer cooling too at a suitable point through the gap between two pipelines.

Figure 15:
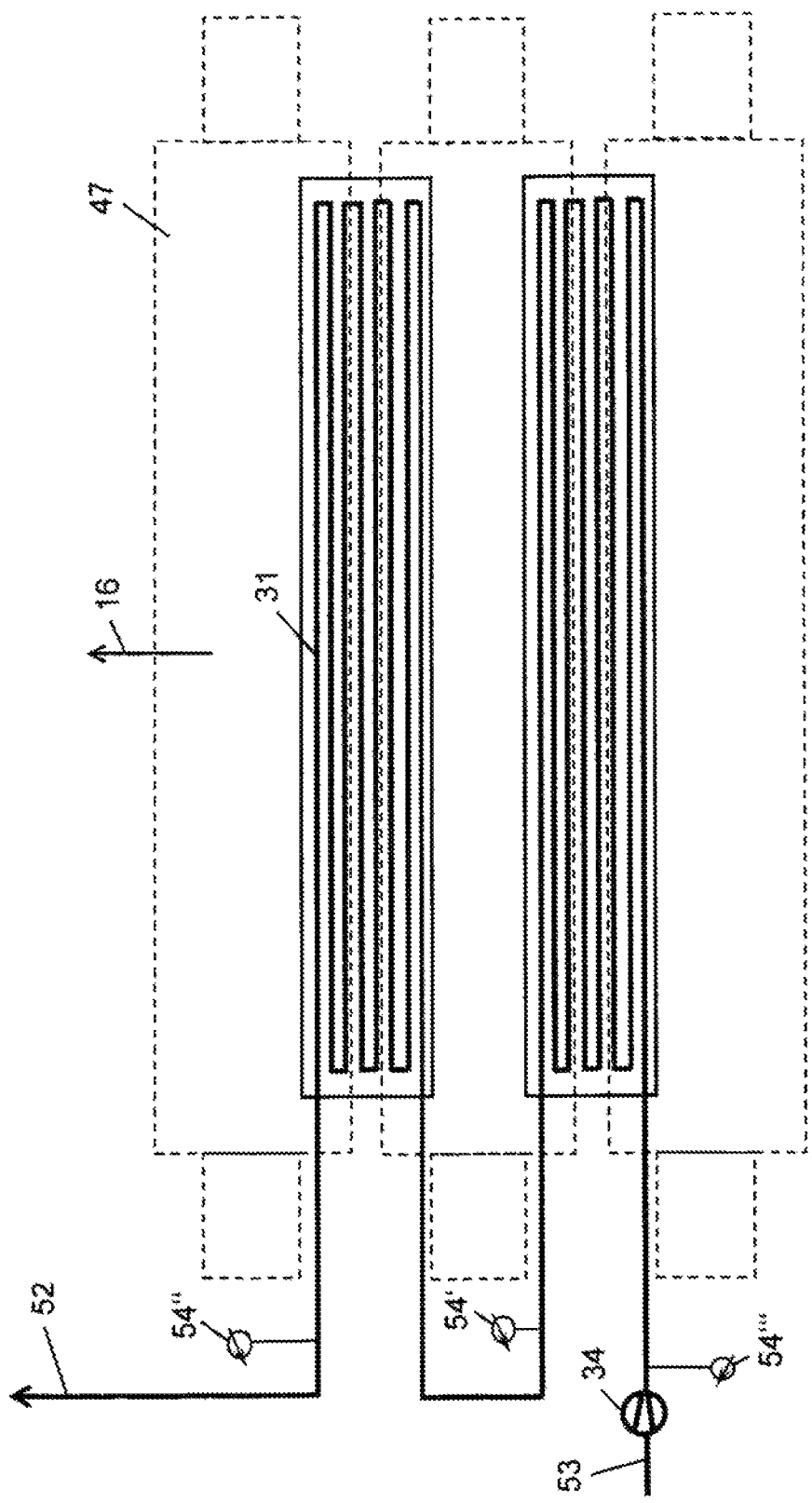

FIG. 15 shows a billet cooling of this type in plan view in the viewing direction of the segment rollers 47, which are shown only diagrammatically. The width of the heat exchanger 31 is somewhat narrower than the maximum slab width of the plant. The side attachments of the heat exchangers are not shown. The heat exchanger transport lines 33 are provided in a meandering manner. Alternatively, the heat-transfer liquid can flow through the segment rollers completely from right to left or vice versa.

The heat-transfer liquid is conveyed by a feed pump 34 through the one heat exchanger or several heat exchangers 31 one after the other, until it is conducted back to the power-generating plant. Advantageously, the line 53 coming from the power-generating plant is conducted to the heat exchanger 31, which is exposed to the highest thermal load. The segment roller support frames (not shown) can be provided with internal coolers.

In the case of low continuous-casting plant production (casting speed) or with certain materials that have to be cast slowly, the last billet segment can be constituted instead of as a billet guide as a heat exchanger for example according to FIG. 11a 11b alternatively changeably.

A further alternative structural embodiment to absorb the heat of the cast billet 10' is shown in FIG. 15a in the front view and in FIG. 15b in the side view. The figures show a small section of a continuous-casting plant half, comprising three segment rollers 47 that are indicated only by dashed lines as well as the cast billet 10' indicated by dot-dashed lines. Here heat exchangers 116 (gas passage) are provided between the segment rollers 47, through which here a gaseous medium 95 (for example air) is conveyed. The emitted radiant heat of the cast billet 10' is emitted to the heat exchanger plate of the gas passage 116 and is absorbed by the gaseous medium 95. Ribs 118 in the gas passage 116 increase the convective heat-transfer. The ribs 118 can also be constructed in the form of turbulence plates. The side of the heat exchanger 116 facing away from the slabs is made to be thermally insulating. This insulating cassette 39 reduces heat losses. With the aid of one or more blowers 67, the gaseous medium 95 is conveyed from the heat exchangers 116 via gas transport lines 96 to one or more heat exchangers 31 outside or next to the continuous-casting plant. These gas transport lines 96 are constituted as loop lines here and provided with thermal insulation 97.

The temperature (measured with a temperature sensor 119) of the gaseous medium for example downstream of the heat exchanger 31 is adjusted depending on the conditions at the power-generating plant or other target specifications. The volume flow of the blower 67 is used as control element.

The heat exchanger 31 absorbs the heat of the gaseous medium. This is conveyed via a heat transport line 33 and possibly via manifolds 52 with a liquid heat-transfer medium (for example thermal oil) to a power-generating plant 50 with a pump 34, where it in turn dissipates the heat to the heat exchanger 51.

The continuous-casting plant furnishes inlet temperatures of the heat-transfer medium at different levels. The segment rollers 57 are approved only for lower roller temperatures, depending on the roller material, in order to not negatively affect roller wear and strength. The heat exchangers between the rollers 31 do not have a supporting function and are suitable for higher temperatures.

In order to optimize the efficiency of the power-generating plant (for example ORC plant), it is equipped with one, preferably however with several heat exchangers, as shown by the embodiment of FIG. 16. Here a part of the heat generator plant circuit 87 is shown above. Different target temperatures 88, 88' are aimed for the two shown different heat exchanger circuits 57-70'-80-34 and 31-70-82-82-34 from the continuous-casting plant to the power-generating plant, which temperatures are incrementally increased. The temperature sources (heat-transfer medium 70') with lower temperature level 88' of for example 200° C. serve here to preheat the working medium (in the preheater 80) in the power-generating plant. For this purpose, the segment-roller heat exchanger 57 in the continuous-casting plant is used. The highest temperature 88 of, for example 320° C. of the heat-transfer medium 70 is expected at the evaporator heat exchanger 82. Here the working medium of the power-generating plant in the working circuit 87 is increased from an intermediate temperature to evaporating temperature level and evaporates 90. This takes place through correspondingly high inlet temperatures 88 of the heat transport medium 70. To this end the heat exchanger between the segment rollers 31 in the continuous-casting plant is used. Various heat-transfer media 70, 70' are also used, adapted to the different temperatures levels 88, 88' of the two heat exchanger circuits shown. Before the heating of the working medium in the power generating circuit 87, the working medium 89 was liquefied in the condenser 84, so that the feed pump 83 can transport the working medium. The condenser heat is transferred via heat-transfer lines 86, 86' with the aid of a pump 85 to air coolers, cooling tower and/or heat consumers and/or combustion air preheaters.

Figure 17:
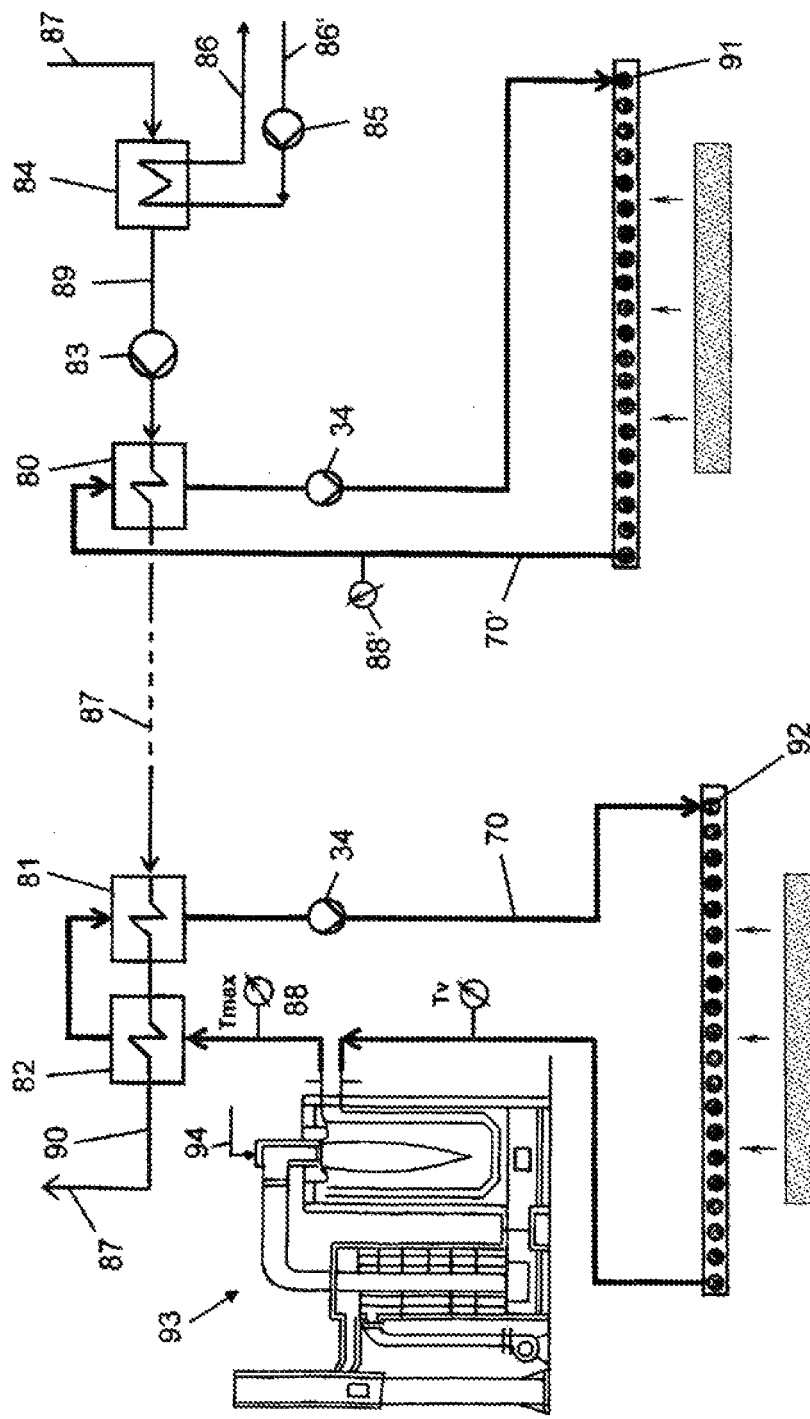
FIG. 17 is a view like FIG. 16 but with thermal oil postheating in an inlet line to the heat exchanger of the power-generating plant.

Alternatively, the thermal oil flow of a heat exchanger 92 can be somewhat post-heated in a thermal oil heater 93 accordingly before it is conveyed to the power-generating plant (heat exchanger 82) shown in FIG. 17. The thermal oil heater 93 is a furnace with integrated heat exchanger with which the thermal oil flow can be heated by a flame. The flame is fed by oil, natural gas or preferably blast furnace gas, coke gas or converter gas 94. The heater performance of the thermal oil heater is adjusted depending on the heat-transfer temperature Tv measured before it and increased to the desired maximum temperature level Tmax. Alternatively, it is also possible to supply the heating circuit 70 (without heat exchanger 92) only with a thermal oil heater 93. The heat exchanger 91 is constituted only symbolically as a plate heat exchanger unit. The statements on this and the other heat exchanger circuits can also correspond to the statements according to FIG. 16.

Additional heat sources from the roller plant or continuous-casting plant can also be used as preheaters 80, 81 like those listed above. Steam suction or waste heat from flue gases that have a level of >100° C. are also conceivable.

Figure 18:
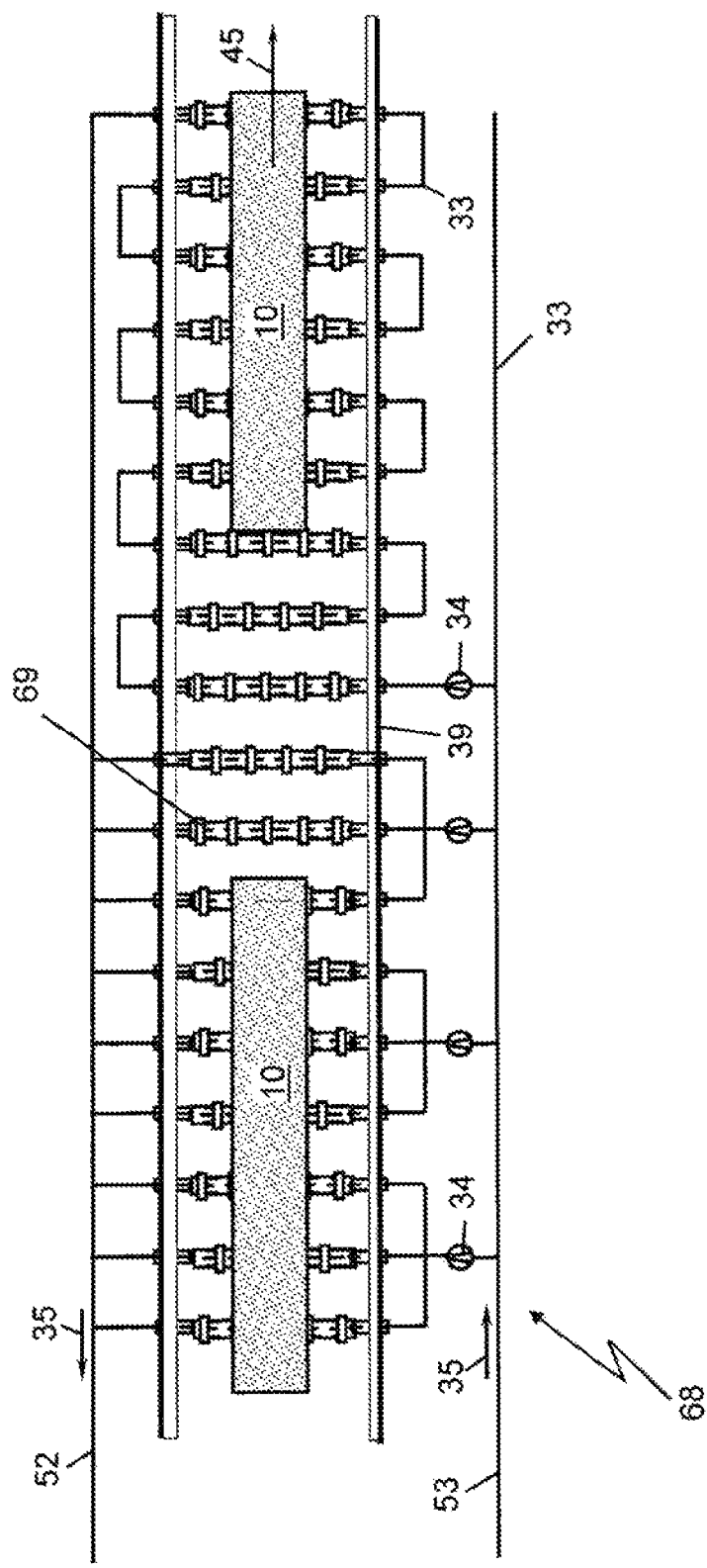
FIG. 18 shows a CSP roller hearth furnace with recovery of the furnace roller losses.

A roller-hearth furnace 68 is located downstream of the continuous-casting plant of a CSP plant, as is shown for a small section of FIG. 18. Here the slab-storage area is omitted, instead the thin slab 10 is heated somewhat in the roller hearth furnace 68 and directly transported further to the rolling mill. The losses in the roller hearth furnace, which are dissipated via the furnace rollers 69, are relatively high. In order to reduce them, it is provided analogously to the cited example of a transport roller heat exchanger in FIGS. 10 and 11, to cool the furnace rollers 69 with thermal oil instead of water and additionally to use this lost heat for power generation. Thermal oil makes it possible to cool at higher temperatures without steam generation in the cooling circuit having to be expected. Compared to FIG. 10, here heat exchangers are provided only in the rollers 69. The explanations on the piping can be taken from the description for FIG. 10. The furnace rollers 69 in particular the disks of the furnace rollers thus achieve a higher temperature and thereby lead to lower heat losses. In addition to the normal use of the waste gas temperatures downstream of the recovery systems for fresh gas preheating for the slab furnace, further heat exchangers for energy recovery are also installed in the waste gas passage, and these are likewise connected to the power-generating plant. This heat exchanger circuit is not shown in FIG. 18. Through the advantageous combination of the roller cooling heat and the waste gas energy, which are fed to the power-generating plant via heat exchangers and heat-transfer lines in the known manner, a heat recovery and power generation with worthwhile heat quantities can also be carried out economically for CSP plants and the losses can also be reduced there.

Figure 19:
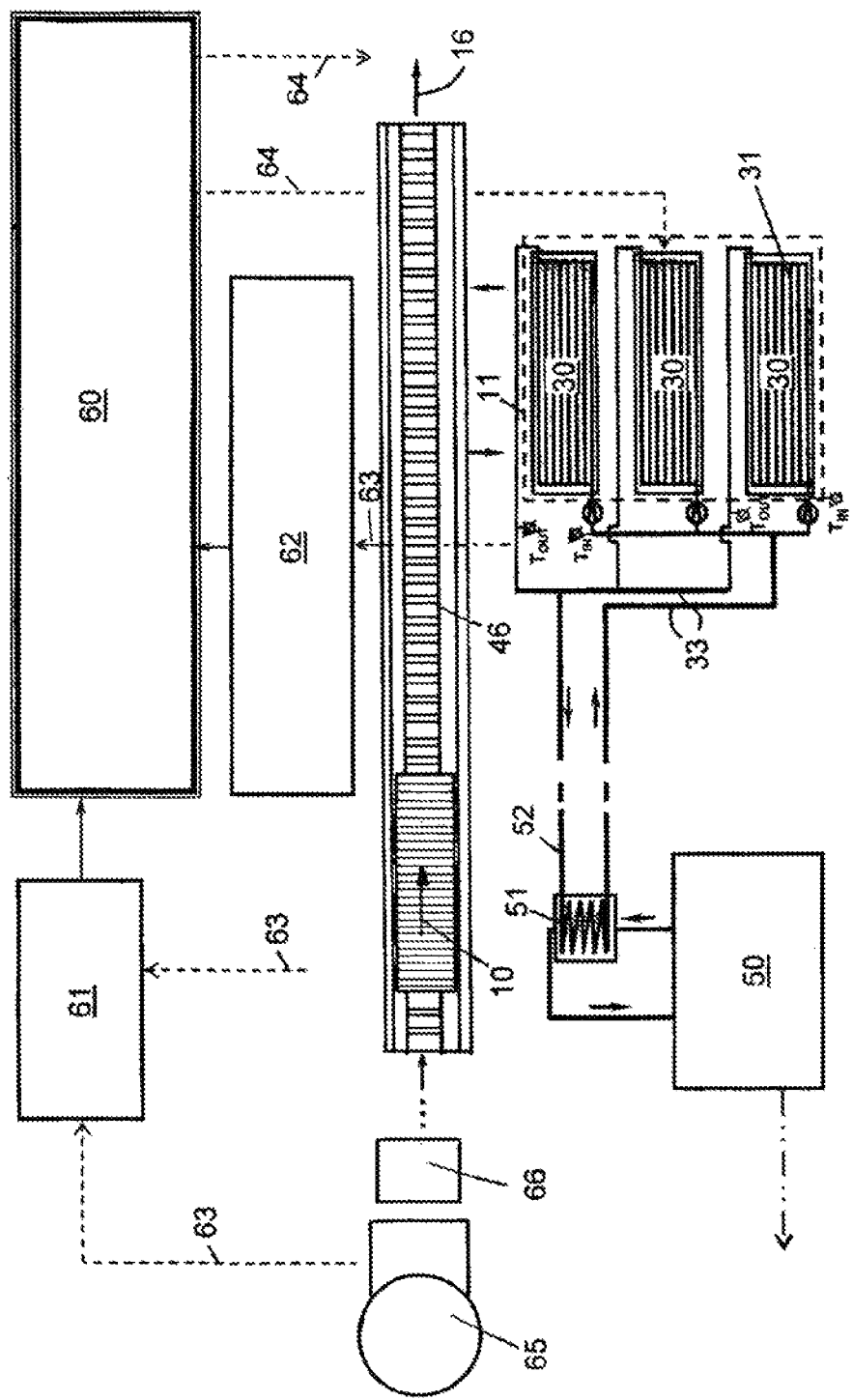
FIG. 19 shows a process model

A process model 60 for controlling the entire process of the conversion of the residual heat inside the continuous-casting plant and from slabs or coils into electric energy including the necessary slab handling is shown in FIG. 19 by way of example based on the cooling of slabs. Hot slabs 10 are transported on a roller conveyor 46 from the continuous-casting plant 65 or flame-cutting plant 66 to the slab-storage area 11 and there deposited on storage areas 30 with heat exchangers 31 (according to FIG. 3, for example). After cooling has been carried out, the cooled slabs 10 are then removed from the slab-storage area 11 and placed on other slab storage locations without heat exchangers or conveyed in the transport direction 16 to the rolling mill. The heat-transfer medium heated in the heat exchangers 31 is conducted via heat-transfer transport lines 33 and a manifold 52 to a preheater or evaporator 51 of the power-generating plant 50.

Information that relates to slabs 10 (slab input 61) as well as the storage areas 30 and heat exchangers 31 (storage area input 62) is conveyed to the process model 60 via corresponding signal lines 63:

Slab input: Slab tonnage, slab geometry, slab temperature (measured, calculated) casting speed, Storage area input: Measured inlet and outlet temperature of the heat-transfer medium for each storage area or heat exchanger. The same applies also when the heat exchangers are composed of heat exchanger rollers.

From this information process parameters are calculated in the process model 60 and used via corresponding control lines 64 for controlling the slab handling. In detail the following calculations are made:

Calculation of the slab temperatures and combination with the slab sorting and storage system.

Optimization of the slab discharge temperature depending on the storage areas

Calculation of the temperature the slabs in the storage areas.

Pump capacity for each heat exchanger depending on the inlet and outlet temperature of the heat-transfer medium.

Switching and regulating valves depending on the temperature of the heat-transfer medium and assignment to the heat exchangers of the power-generating plant.

Stipulation of the target temperatures for the different heat exchangers or heat transport media.

Calculation of the total heat flow (temperature, mass flow) to the power-generating plant.

Stipulation of the casting speed in the continuous-casting plant.

Determination of the discharge time of the slabs from the storage areas

The heat exchanger units according to the invention are constructed such that they can easily be replaced by section in order improve their maintenance and accessibility. This applies with heat exchangers in high-rise slab and coil-storage areas, normal slab or coil storage shelves as well as heat exchangers between the segment rollers.

In order to increase the efficiency of the heat-transfer of the heat exchangers, turbulence plates (see FIGS. 20a, 20b, 20c) can be installed in the individual pipelines of the heat exchanger. The difference between the average heat-transfer temperature and the maximum heat-transfer temperature (primarily on the pipe surface) is reduced hereby. Furthermore, the heat-transfer temperatures on the side of the energy supply and on the side facing away from the heat sources are brought closer. This effect of better mixing is particularly advantageous for this application case, because higher outlet temperatures can be provided to the heat exchangers of the power-generating plant and/or overheating of the heat-transfer medium on the surface of the pipe inside can be is avoided.

Heat exchanger sections with turbulence plates 98 in the heat exchanger lines with indicated webs 101 are shown in FIGS. 20a, 20b, 20c. A pipe section with turbulence plates 99, 100 with alternating different pitches can be seen in FIG. 20a. A further illustrated embodiment with turbulence plate 99 and turbulence plate holder 102 in the pipe center is shown by FIG. 20b. The turbulence plates are constructed such that no dead volumes occur or bottlenecks are avoided. The turbulence plates 99 can bear against the pipe wall surface or primarily be attached to the side of the heat source at a spacing from the wall. Another variant for increasing efficiency is the use of heat-exchanger pipes 103 with interior webs 104 corresponding to FIG. 20c. Through the good connection of the web to the pipe, the heat exchange is additionally increased. The webs can be constructed as a straight or spiral manner in the longitudinal direction of the pipe so that the heat-transfer medium on the inside of the pipe runs through different temperature levels (toward or away from the heat source side). There are 1 to n inner webs.

The heat-exchanger pipes with turbulence plates can be straight or curved. Further examples of turbulence plate arrangements, for example in mixers, can be taken from printed publications DE 2 262 016, DE 2 648 086, DE 695 04 892, EP 084 180.

Figure 21:
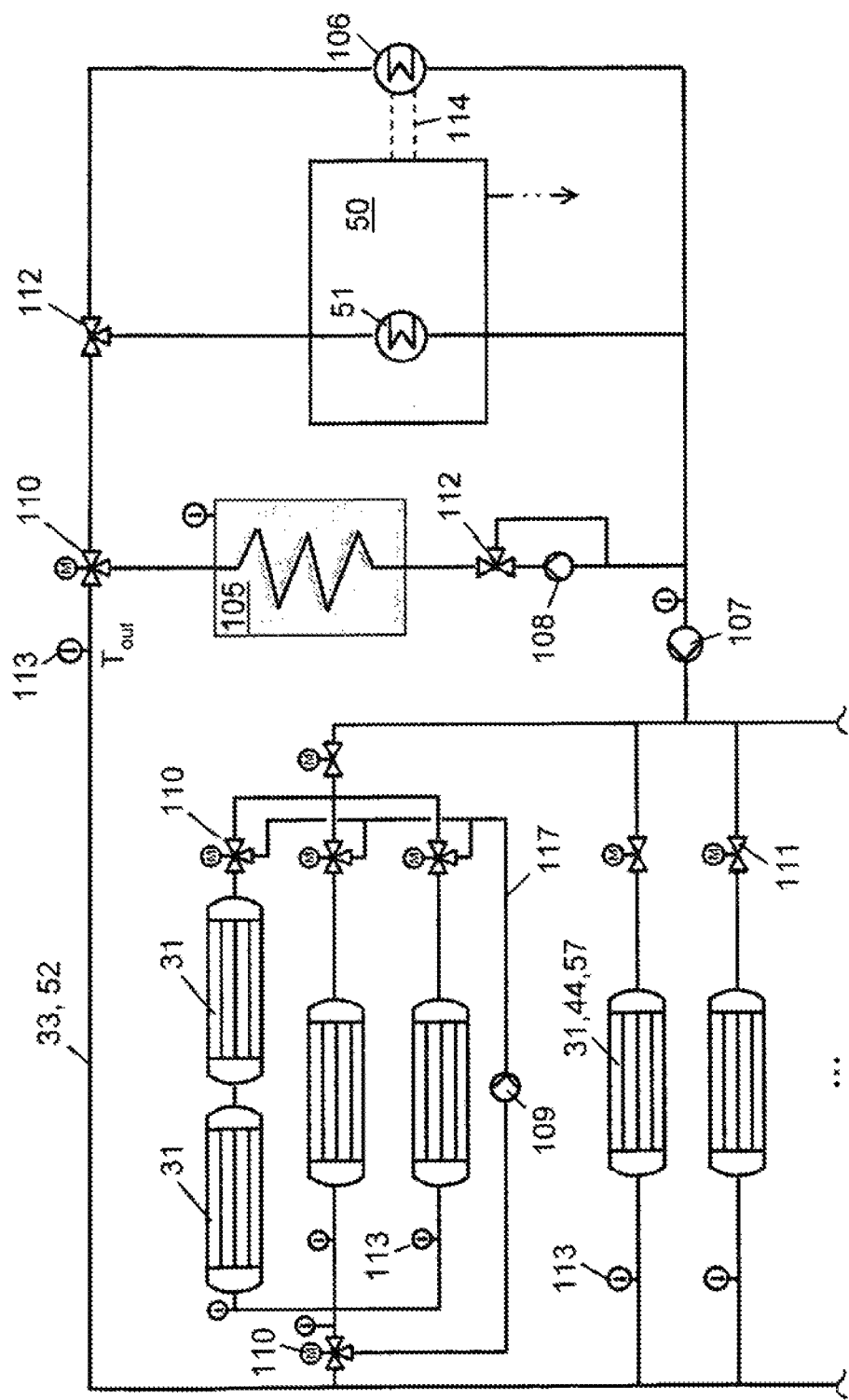
FIG. 21 is a plant diagram of the heat exchanger power-generating plant.

A typical embodiment for a plant pipe diagram, which in principle describes the heat transport from the heat source (heat exchanger 31, 44, 57) of the metal processing plant to the power-generating plant (for example ORC plant 50), is shown in FIG. 21. The main heat transport circuit is thereby composed of feed pump 107, mixer 110, flow control valve 111, heat exchanger 31 and heat exchanger 51 of the power-generating plant 50.

In order to be able to adjust the target inlet is temperatures for the power-generating plant, i.e., before the heat exchanger 51, the volume flow of the feed pump 107 and/or the mixers 110 or the flow control valve 111 are used. If running through a heat exchanger once is not sufficient in order to adjust the target temperatures, a return line 117 is provided. The volume flow is adjusted in this return line 117 from the pump 109 and for mixers 110 provided for each heat exchanger or heat exchanger group. With the control process, the temperatures of the heat transport medium at different points of the pipeline system are monitored by measuring instruments 113 and the control elements (pumps 107, 109 as well as mixers 110, valves 111) are controlled by a process model. It is also provided to measure the volume flow at different points and to include it in the regulation.

The heat exchangers are connected in parallel or in series to one another. The heat exchanger with the highest ambient temperature is generally used as the last heat exchanger before the heat-transfer medium is transported via the shift valve 112 toward the power-generating plant 50.

If there is an excess heat supply that goes beyond the capacity of the power-generating plant 50, or if the power-generating plant has a defect, it is optionally provided to discharge the excess heat to the heat storage devices 105. To this end a mixer 110 deflects a partial flow toward the heat storage tanks 105. However, if the heat exchangers 31 no longer emit any heat, the stored heat can be transported with the pump 108 from the storage container 105 to the heat exchanger 51 of the power-generating plant.

The heat storage device 105 is generally stationary. However, it can also be constructed in a replaceable manner for a transport of the heat (for example by truck). The heat storage is device can be composed of several storage units in different embodiments.

If the power-generating plant fails, heat is transferred to an emergency cooler 106. The flow through circuit is then changed correspondingly by the shift valve 112. This emergency cooler 106 can also optionally be used as a condenser cooler of the power-generating plant and is connected via the cooling pipes 114 thereto.

Safety lines, safety valves, filling and draining pumps, emergency pumps, reserve pumps, expansion vessel, inert gas plant, etc., which are present with normal thermal oil plants, are components of the overall plant, but have been omitted from this simplified functional diagram.

The invention claimed is:

1. A method for recovering energy from steel products produced in a steel mill, the method comprising the steps of:
    transporting the steel products into a storage area;
    extracting heat from the steel products prior to or after transport into the storage area by means of heat exchangers for a predetermined period;
    in this period, transferring residual heat of the steel products by means of the heat exchangers into a heat-transfer medium to heat same;
    transporting the heat-transfer medium via heat-transfer transport lines for power generation or for direct use of process heat in other heat consumers; and
    carrying out the transport of the heat-transfer medium from the heat exchangers to the power-generating plant in the heat-transfer transport lines only at pump feed pressure or using as a heat-transfer medium liquid mineral or synthetic thermal oil or a salt melt so as not to build up a steam pressure above 2 bar.

2. The method according to claim 1, wherein inlet and return temperatures of the heat-transfer medium are measured at several points and flow volume is controlled such that a maximum admissible temperature of the heat-transfer medium is not exceeded or a desired target temperature is set.

3. The method according to claim 1, further comprising the step of:
    using adjustable feed pumps or mixing and flow control valves to adjust a flow volume for the heat exchangers.

4. The method according to claim 1, further comprising the step of:
    flowing the heat-transfer medium via a return line through the heat exchangers in order to adjust a target temperature of the heat-transfer medium.

5. The method according to claim 1, wherein the heat exchangers are provided between segment rollers, the method further comprising the steps of:
    flowing a gaseous medium through the segment rollers to absorb radiant heat therefrom;
    transporting the absorbed radiant heat in the gaseous medium by at least one blower in a gas transport line to large-area heat exchangers to absorb heat from the gaseous medium, and discharging the absorbed heat via a heat-transfer line with the liquid heat-transfer medium to a heat exchanger of a power-generating plant.

* * * * *